United States Patent
Choudhary et al.

(10) Patent No.: US 12,020,484 B2
(45) Date of Patent: Jun. 25, 2024

(54) METHODS AND SYSTEMS FOR GROUPING OF MEDIA BASED ON SIMILARITIES BETWEEN FEATURES OF THE MEDIA

(71) Applicant: SAMSUNG ELECTRONICS CO., LTD., Suwon-si (KR)

(72) Inventors: Shwetank Choudhary, Bangalore (IN); Tanmay Bansal, Bangalore (IN); Punuru Sri Lakshmi, Bangalore (IN); Chittur Ravichander Karthik, Bangalore (IN); Mahender Rampelli, Bangalore (IN); Nandini Narayanaswamy, Bangalore (IN); Praveen Bangre Prabhakar Rao, Bangalore (IN); Dwaraka Bhamidipati Sreevatsa, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 17/434,669

(22) PCT Filed: Mar. 3, 2021

(86) PCT No.: PCT/KR2021/002625
§ 371 (c)(1),
(2) Date: Aug. 27, 2021

(87) PCT Pub. No.: WO2021/187776
PCT Pub. Date: Sep. 23, 2021

(65) Prior Publication Data
US 2022/0292809 A1  Sep. 15, 2022

(30) Foreign Application Priority Data

Mar. 17, 2020 (IN) .............................. 202041011411
Jan. 29, 2021 (IN) .............................. 202041011411

(51) Int. Cl.
*G06V 20/40* (2022.01)
*G06V 10/44* (2022.01)
(Continued)

(52) U.S. Cl.
CPC ............ *G06V 20/48* (2022.01); *G06V 10/454* (2022.01); *G06V 10/761* (2022.01);
(Continued)

(58) Field of Classification Search
None
See application file for complete search history.

(56) References Cited

U.S. PATENT DOCUMENTS 7,813,561 B2 * 10/2010 Jia .......................... G06F 16/583
382/227
9,424,461 B1 * 8/2016 Yuan ..................... G06V 20/647
(Continued)

FOREIGN PATENT DOCUMENTS

| JP | 2005-250562 A | 9/2005 |
| JP | 2018-205937 A | 12/2018 |

OTHER PUBLICATIONS

CN 108764258 A English abstract (Year: 2018).*
(Continued)

*Primary Examiner* — Michelle M Entezari Hausmann
(74) *Attorney, Agent, or Firm* — Sughrue Mion, PLLC

(57) ABSTRACT

Methods and systems for grouping of media based on similarities between features of media data are provided. A method of managing a plurality of images may include: identifying a threshold distance for clustering the plurality of images based on a degree of similarity between the plurality of images; extracting a plurality of feature vectors corresponding to the plurality of images; and generating at least one cluster comprising at least two images among the plurality of images, based on cosine distances between
(Continued)

feature vectors corresponding to the at least two images being less than the threshold distance.

19 Claims, 26 Drawing Sheets

(51) Int. Cl.
*G06V 10/74* (2022.01)
*G06V 10/762* (2022.01)
*G06V 10/82* (2022.01)

(52) U.S. Cl.
CPC ............ *G06V 10/762* (2022.01); *G06V 20/46* (2022.01); *G06V 10/82* (2022.01); *G06V 2201/10* (2022.01)

(56) References Cited

U.S. PATENT DOCUMENTS

| | | | |
|---|---|---|---|
| 11,003,959 B1* | 5/2021 | Levner | G06V 10/762 |
| 2007/0076960 A1* | 4/2007 | Takamori | G06F 16/5838 |
| | | | 348/231.2 |
| 2009/0060294 A1 | 3/2009 | Matsubara et al. | |
| 2010/0067791 A1* | 3/2010 | Dai | G06V 20/63 |
| | | | 382/167 |
| 2013/0044927 A1* | 2/2013 | Poole | G06T 7/0014 |
| | | | 382/128 |
| 2014/0161348 A1* | 6/2014 | Sutherland | G06F 16/5838 |
| | | | 382/172 |
| 2016/0125273 A1 | 5/2016 | Matsunaga | |
| 2016/0358035 A1* | 12/2016 | Ruan | G06F 18/2415 |
| 2018/0189325 A1 | 7/2018 | Hohwald et al. | |
| 2018/0196877 A1* | 7/2018 | Mertens | G06F 16/9535 |
| 2019/0311225 A1 | 10/2019 | Nomoto et al. | |
| 2020/0133930 A1* | 4/2020 | Nishimura | G06F 16/248 |
| 2020/0193552 A1* | 6/2020 | Turkelson | G06N 20/20 |
| 2021/0073514 A1* | 3/2021 | Sangala | G06F 18/22 |

OTHER PUBLICATIONS

Rahman, Md Mahmudur, Bipin C. Desai, and Prabir Bhattacharya. "A feature level fusion in similarity matching to content-based image retrieval." 2006 9th International Conference on Information Fusion. IEEE, 2006. (Year: 2006).*

Dao, Tuan, et al. "Managing redundant content in bandwidth constrained wireless networks." Proceedings of the 10th ACM International on Conference on emerging Networking Experiments and Technologies. 2014. (Year: 2014).*

Wang, Xin-Jing, Lei Zhang, and Ce Liu. "Duplicate discovery on 2 billion internet images." Proceedings of the IEEE conference on computer vision and pattern recognition workshops. 2013. (Year: 2013).*

International Search Report and Written Opinion dated Jun. 7, 2021 issued by the International Searching Authority in counterpart Application No. PCT/KR2021/002625 (PCT/ISA/220, PCT/ISA/210, and PCT/ISA/237).

* cited by examiner

Currently Used Theme

Generated Theme Pack

Currently Used Theme

Generated Theme Pack

Currently Used Theme

Generated Theme Pack

METHODS AND SYSTEMS FOR GROUPING OF MEDIA BASED ON SIMILARITIES BETWEEN FEATURES OF THE MEDIA

CROSS-REFERENCE TO RELATED APPLICATIONS

This application is a national phase application of International Application No. PCT/KR2021/002625 filed on Mar. 3, 2021, which claims priority to Indian Provisional Patent Application No. 202041011411, filed on Mar. 17, 2020, and Indian Complete Patent Application No. 202041011411, filed on Jan. 29, 2021, in the Indian Patent Office, the disclosures of which are incorporated herein by reference in their entireties.

BACKGROUND

1. Field

The disclosure relates to media processing, and more particularly, to methods and systems for identifying similarities between features of media and clustering the media into groups based on the identified similarities between the features in the media.

2. Description of Related Art

Currently, user devices such as smartphones, tablets, laptop, personal computers, and so on, may include redundant content which occupies a significant portion of the memory of the user devices. Examples of redundant content may include media such as duplicate/similar images, multiple copies of a single audio/video file, and so on. The redundancy of content can be caused by capturing images in burst (some of the captured images may be duplicates, while some of the captured images have a slight variation in pixel and can be visually perceived to be similar), receiving the same media content (images, recordings, videos) from multiple sources/users (primarily through social media applications and chat platforms), improper organization of data, and so on.

Over a period of time, as the redundant content keeps accumulating in the memory of a user device, the user is likely to be burdened with the task of organizing a large quantity of data. The task may be necessary, particularly if the ratio of an occupied portion of the memory of the user device and an available portion of the memory of the user device increases, which leads to obstruction of primary functionalities of the user device. The redundant content can prevent efficient and effective usage of Read Only Memory (ROM), thereby obstructing the smooth functioning of the user device. This may also lead to an increase in the latency of execution of instructions.

SUMMARY

Provided are methods and systems for extracting features of media, identifying similarities between the features of the media, and dynamically clustering the media into groups based on the identified similarities between the features of the media.

Further, provided is a neural network model including a plurality of layers, wherein the neural network model is configured to extract spatial features and global features of an image.

Still further, provided are a method and apparatus for generating a summary of the spatial features and the global features of the image to generate an n-dimensional feature vector representing the features of the image.

Still further, provided are a method and an apparatus for creating clusters including a plurality of images, wherein the distances between the feature vectors, corresponding to each of the plurality of images in each cluster, is less than a preconfigured threshold.

Still further, provided are a method and an apparatus for enabling a dynamic configuration of the threshold for facilitating the creation of clusters including a plurality of images, and varying the degree of similarity between the plurality of images in each of the clusters at multiple-levels, wherein the dynamic configuration of the threshold leads to variations in the number of clusters that are created and the number of images in each of the created clusters.

Still further, provided are a method and an apparatus for generating spectrogram images from a predefined number of samples of an audio file, generating feature vectors corresponding to each of the spectrogram images, and concatenating the feature vectors of the spectrogram images of the samples to generate the feature vector of the audio file.

Still further, provided are a method and an apparatus for comparing the feature vectors of a plurality of audio files to detect whether the plurality of audio files are duplicate, wherein the plurality of audio files are detected as duplicate if distance between the feature vectors of the audio files is less than a predefined threshold.

Still further, provided are a method and an apparatus for selecting a predefined number of frame-sets of a video file; generating spectrogram images corresponding to the audio portions of each of the frame-sets of the video file, generating feature vectors of the spectrogram images of the audio portions of each of the frame-sets, and concatenating the feature vectors of the spectrogram images of the audio portions of each of the frame-sets to generate the audio feature vector of the video file.

Still further, provided are a method and an apparatus for enabling comparison between the audio feature vectors of a plurality of video files to detect that the audio portions of the plurality of video files are duplicate, wherein the audio portions of the plurality of video files are detected as duplicate if distance between the audio feature vectors of the plurality of video files is less than a predefined threshold.

Still further, provided are a method and an apparatus for extracting feature vectors of each of the frames in each of the frame-sets of a video file, and concatenating the feature vectors of each of the frames in each of the frame-sets to generate a visual feature vector.

Still further, provided are a method and an apparatus for enabling comparison between the visual feature vectors of a plurality of video files to detect whether the plurality of video files are duplicate, wherein the plurality of video files are detected as duplicate if distance between the visual feature vectors of the plurality of video files is less than a predefined threshold.

Still further, provided are a method and an apparatus for detecting video files as duplicate, if audio feature vectors and visual feature vectors of the video files are detected as duplicate.

According to an aspect of the disclosure, there is provided a method of managing a plurality of images, including: identifying a threshold distance for clustering the plurality of images based on a degree of similarity between the plurality of images; extracting a plurality of feature vectors corresponding to the plurality of images; and generating at least one cluster including at least two images among the plurality of images, based on cosine distances between feature vectors corresponding to the at least two images being less than the threshold distance.

The extracting of the plurality of feature vectors corresponding to the plurality of images may include: identifying spatial features and global features of each of the plurality of images; and generating each of the plurality of feature vectors corresponding to each of the plurality of images by summarizing the spatial features and the global features of each of the plurality of images.

The spatial features may include at least one of a shape and a contour of at least one object superimposed on a background of each of the plurality of images, a position of the at least one object, and a relative position of the at least one object with respect to at least one other object in each of the plurality of images.

The global features may include at least one of pixel density, texture, density of color, and color distribution across each of the plurality of images.

The degree of similarity between the plurality of images may be categorized into one of a duplicate category, a near-duplicate category, a similar category, a near-similar category, and a dissimilar category, wherein the threshold distance may correspond to one of the duplicate category, the near-duplicate category, the similar category, and the near-similar category.

When the threshold distance corresponds to the duplicate category, the at least two images in each cluster of the at least one cluster may be determined to be duplicates; when the threshold distance corresponds to the near-duplicate category, the at least two images in each cluster of the at least one cluster may be determined to be duplicates or near-duplicates; when the threshold distance corresponds to the similar category, the at least two images in each cluster of the at least one cluster may be determined to be duplicates, near-duplicates, or similar; and when the threshold distance corresponds to the near-similar category, the at least two images in each cluster of the at least one cluster may be determined to be duplicates, near-duplicates, similar, or near-similar.

The method may include identifying a reference image among the plurality of images, wherein the generating the at least one cluster may include generating a first cluster including the reference image and at least one image of the plurality of images, wherein a cosine distance between one of the feature vectors that corresponds to the reference image and at least one feature vector corresponding to the at least one image in the first cluster may be less than the threshold distance.

The method may further include: identifying metadata pertaining to each of the plurality of images; and grouping the plurality of images based on the metadata.

The metadata may include at least one of a timestamp indicating a date and a time when each of the plurality of images was captured and a location where each of the plurality of images was captured.

According to an aspect of the disclosure, there is provided an electronic device for managing a plurality of images, the electronic device including: a memory storing at least one instruction; and at least one processor configured to execute the at least one instruction to: identify a threshold distance for clustering the plurality of images based on a degree of similarity between the plurality of images; extract a plurality of feature vectors corresponding to the plurality of images; and generate at least one cluster including at least two images among the plurality of images, based on cosine distances between feature vectors corresponding to the at least two images being less than the threshold distance.

According to an aspect of the disclosure, there is provided a non-transitory computer-readable storage medium storing instructions that are executable by at least one processor to perform a method of managing a plurality of images, the method including: identifying a threshold distance for clustering the plurality of images based on a degree of similarity between the plurality of images; extracting a plurality of feature vectors corresponding to the plurality of images; and generating at least one cluster including at least two images among the plurality of images, based on cosine distances between feature vectors corresponding to the at least two images being less than the threshold distance.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
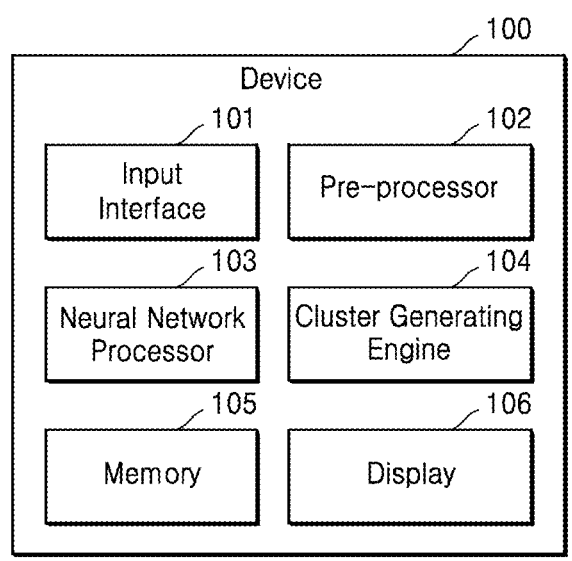
FIG. 1 depicts a device configured to detect similarity between features of a plurality of images and create clusters of images based on the detected similarities between the features of the images, according to embodiments of the disclosure.

Embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

While such terms as "first," "second," etc., may be used to describe various elements, such elements must not be limited to the above terms. The above terms may be used only to distinguish one element from another.

Accordingly, the embodiments provide methods and systems for creating clusters of images based on different degrees of similarities between features of the images in each of the clusters. The embodiments include receiving an input threshold distance. The embodiments include creating clusters of images, wherein the differences between the features of the images in each of the clusters is less than the threshold distance. The embodiments include determining feature vectors of a plurality of images. The embodiments include preprocessing each of the plurality of images, wherein the plurality of images may be resized to a preconfigured size. The images in grayscale may be converted to an RGB format. The pixel values of each of the plurality of images may be normalized and represented as a 1-D array of pixel values.

The embodiments include generating feature vectors of each of the plurality of images by extracting spatial features and global features. The spatial features include shape and contour of at least one object in the image, position of the at least one object, relative position of the at least one object with respect to other objects, and so on. The global features include pixel density, density of color, color distribution of the image, and so on. The embodiments include summarizing the extracted spatial and global features of each of the plurality of images for generating the feature vectors of the plurality of image. The embodiments include creating clusters of images, wherein the cosine distance between the feature vectors of the images in each of the clusters is less than the received threshold distance. The embodiments include creating the clusters using a linear scan and a tree clustering method. The linear scan involves categorizing the plurality of images based on metadata pertaining to the images, such as temporal data and location specific data. The temporal data refers to the timestamp that indicates the date and time when an image was captured. The location specific data refers to the location at which an image was captured. The embodiments include selecting images, amongst the plurality of images, which have been captured at the same time and/or images that have been captured at the same location. The selected images are provided to the tree clustering method. If the metadata pertaining to the plurality of images is not available, each of the plurality of images may be considered as input data points by the tree clustering method.

The tree clustering method determines the cosine distances between the feature vectors of the selected images, and creates one or more clusters including the selected images, wherein the cosine distances between the feature vectors of the images in each of the created clusters is less than the received threshold distance. The threshold distance defines the boundary of the degree of similarity between the feature vectors of the images that will be grouped together in the clusters. The threshold distance is a value of cosine distance, wherein the cosine distance between the feature vectors of the images in each of the clusters is less than the threshold distance. If the threshold distance is high, the degree of similarity between the images in the clusters will vary from high to low. If the threshold distance is low, the degree of similarity between the images in the clusters will be high.

The degrees of similarity are duplicate, near-duplicate, similar, and near-similar. The degree of similarity between images decrease from duplicate to near-similar, wherein images having the highest similarity are duplicate and images with least similarity are near-similar. According to the embodiments, the cosine distance between the feature vectors of the images in the clusters may be correlated with the degree of similarity between the feature vectors of the images in the clusters. If the threshold distance is set such that the degree of similarity is near-similar, then clusters will be created, wherein the degree of similarity between the images in the clusters may be near-similar, similar, near-duplicate, and duplicate. If the threshold distance is set such that the degree of similarity is similar, then the degree of similarity between the images in the clusters may be similar, near-duplicate and duplicate. If the threshold distance is set such that the degree of similarity is near-duplicate, then the degree of similarity between the images in the clusters may be near-duplicate and duplicate. If the threshold distance is set such that the degree of similarity is duplicate, then the images in the clusters will be duplicates of each other.

The embodiments include detecting duplicate audio files. The embodiments include selecting a predefined number of audio samples of an audio file. The embodiments include generating spectrogram images corresponding to each of the samples. The embodiments include extracting features of the spectrogram images to generate feature vectors of the spectrogram images. The embodiments include concatenating the feature vectors of the spectrogram images for generating the feature vector of the audio file. Similarly, the embodiments include generating the feature vectors of other audio files. The embodiments include comparing the feature vectors of the audio files for determining the distances between the feature vectors of the audio files. The feature vectors of the audio files are likely to be nearer if the audio files are duplicates. The embodiments include detecting the audio files as duplicate, if the distances between the feature vectors of the audio files are less than a predefined threshold.

The embodiments include detecting duplicate video files. The embodiments include selecting a predefined number of frame-sets of a video file. The embodiments include generating spectrogram images corresponding to the audio portions of each of the frame-sets of the video file, and generating feature vectors that correspond to the spectrogram images. The embodiments include concatenating the feature vectors of the spectrogram images for generating the audio feature vector of the video file. Similarly, the embodiments include generating the audio feature vectors of other video files. The embodiments include comparing the audio feature vectors of the video files for detecting whether the audio portions of the frame-sets of the video files are duplicates. If the distances between audio feature vectors of the video files are less than a predefined threshold, the embodiments include detecting that the audio portions of the frame-sets of the video files are duplicates.

The embodiments include extracting feature vectors of each frame of each of the frame-sets of a video file. The feature vectors of each of the frames in each of the frame-sets may be concatenated to generate a visual feature vector. The embodiments include generating visual feature vectors of other video files. The embodiments include comparing the visual feature vectors of the video files to detect whether the video files are duplicates, wherein the video files are detected as duplicates if distance between the visual feature vectors of the video files is less than a predefined threshold. The embodiments include detecting that the video files are duplicates, if the audio feature vectors of the video files and if the visual feature vectors of the video files are detected as duplicate.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for dynamically clustering media into groups based on similarities between the features of the media. The embodiments include extracting features of media, which may be image, audio, or video. The embodiments include extracting spatial features and global features of a reference image, and generating a summary of the spatial features and the global features of the reference image. The embodiments include optimizing the summary into an n-dimensional feature vector. The embodiments include generating n-dimensional feature vectors corresponding to other images and comparing the feature vector of the reference image with the feature vectors of the other images. The embodiments include determining whether the differences between the feature vectors of the reference image and each of the other images is less than a threshold distance. If the differences are less than the threshold distance, the other images may be considered to be similar to the reference image. The embodiments include creating a cluster including the reference image and the other images.

The embodiments allow dynamic configuration of the threshold distance. The dynamic configuration facilitates multiple-level similarity detection. If the threshold distance is low, and if the differences between the feature vectors of the reference image and each of the other images are less than the threshold distance, then the other images may be considered as duplicates of the reference image. Similarly, by dynamically varying the threshold distance, the embodiments allow detecting similarity at multiple levels.

The embodiments include detecting duplicate audio files. The embodiments include selecting a predefined number of audio samples of an audio file. The embodiments include generating spectrogram images corresponding to each of the samples. The embodiments include extracting features of the spectrogram images to generate feature vectors of the spectrogram images. The embodiments include concatenating the feature vectors of the spectrogram images for generating the feature vector (a joint single embedding) of the audio file. Similarly, the embodiments include generating the feature vectors of other audio files. The embodiments include comparing the feature vectors of the audio files for determining the distances between the feature vectors of the audio files. The feature vectors of the audio files are likely to be closer if the audio files are duplicates. The embodiments include detecting the audio files as duplicate, if the distances between the feature vectors of the audio files are less than a predefined threshold.

The embodiments include detecting duplicate video files. The embodiments include selecting a predefined number of frame-sets of a video file. The embodiments include generating spectrogram images corresponding to the audio portions of each of the frame-sets of the video file, and generating feature vectors that correspond to the spectrogram images. The embodiments include concatenating the feature vectors of the spectrogram images for generating the audio feature vector of the video file. Similarly, the embodiments include generating the audio feature vectors of other video files. The embodiments include comparing the audio feature vectors of the video files for detecting whether the audio portions of the frame-sets of the video files are duplicates. If the distances between audio feature vectors of the video files are less than a predefined threshold, the embodiments include detecting that the audio portions of the frame-sets of the video files are duplicates.

The embodiments include extracting feature vectors of each frame of each of the frame-sets of a video file. The feature vectors of each of the frames in each of the frame-sets may be concatenated to generate a visual feature vector. The embodiments include generating visual feature vectors of other video files. The embodiments include comparing the visual feature vectors of the video files to detect whether the video files are duplicates, wherein the video files are detected as duplicates if distance between the visual feature vectors of the video files is less than a predefined threshold. The embodiments include detecting that the video files are duplicates, if the audio feature vectors of the video files and if the visual feature vectors of the video files are detected as duplicate.

Referring now to the drawings, and more particularly to FIGS. 1 through 12, where similar reference characters denote corresponding features consistently throughout the figures, there are shown embodiments.

FIG. 1 depicts a device 100 that is configured to detect similarity between features of a plurality of images and create clusters of images based on the detected similarities between the features of the images, according to embodiments as disclosed herein. As depicted in FIG. 1, the device 100 includes an input interface 101, a pre-processor 102, a neural network processor 103, a cluster generating engine 104, a memory 105, and a display 106. Examples of the device 100 are, but not limited to, a smart phone, a tablet, a laptop, a computing device, a personal computer, an Internet of Things (IoT) device, a wearable device, a virtual reality device, and so on.

The input interface 101 may receive a query image from a user. The input interface 101 may receive instructions to categorize images, stored in the memory 105, into groups based on similarities between the images. The query image may be considered as a reference image or the device 100 may select one of the images stored in the memory 105 as a reference image. The device 100 may detect other images in the memory 105 that are similar to the reference image.

The reference image may have size 1024×768, 2000× 1600, 800×600, and so on. The reference image may be a Red-Green-Blue (RGB) image. The pre-processor 102 may convert the reference image into an RGB image, if the reference image is not an RGB image. The pre-processor 102 may resize the reference image to a preconfigured size of M×N. In an example, the pre-processor 102 may resize the reference image into a 32×32 RGB image. The pixel values of the reference image may be normalized such that the pixel values fall in the range 0-1.

In an embodiment, the pre-processor 102 may perform a flattening operation, wherein the pixel values of the reference image are arranged in the form of a 1-Dimensional (1D) array. As the reference image is a RGB image, the normalized pixel values of the reference image are represented in the form of a 3-D array, wherein each dimension corresponds to the normalized pixel values of one of the color channels (RGB). The pre-processor 102 may represent the normalized pixel values of the reference image in the form of a 1-D array of dimensions 3×M×N.

In an embodiment, the neural network processor 103 may include an input layer, three feature extraction layers, a feature learning layer, and an output layer. The input layer may receive the pixel values of the reference image. The output layer may generate encoded features, i.e., a feature vector of the reference image. The neural network processor 103 includes a neural network model, which may be trained offline. The neural network model may include an encoder stage and a decoder stage during the training phase. The encoder stage is trained to reduce the dimensions of an input training image. The decoder stage is trained to reconstruct the encoded image to the original dimensions of the input training image. Once the training phase is completed, the neural network model is installed in the device 100. However, during the inference stage, the decoder stage may be discarded.

The 1-D array representing the normalized pixel values of the reference image may be analyzed for extraction of features. In an embodiment, the feature extraction layers of the neural network processor 103 may be Convolutional Neural Network (CNN) layers. The CNN layers may extract spatial features and global features that are pertaining to the reference image, based on the normalized pixel values. The spatial features extracted by the CNN layers may include shape and contour of one or more objects in the reference image that are superimposed on the background, the positions of the one or more objects, coordinates on which the contours of the one or more objects lie, positions of the one or more objects relative to each other, and so on. The global features include color distribution of the reference image, pixel density, texture density of color, and so on.

In an embodiment, the feature learning layer of the neural network processor 103 is a dense layer. The dense layer may generate a summary of the extracted spatial features and extracted global features of the reference image. The summarization of the extracted features by the dense layer allows the neural network processor 103 to generate an n-dimensional feature vector. In an example, if the 1-D array, representing the normalized pixel values of the reference image, at the input layer of the neural network model is of 3×32×32 dimensions, the dense layer may generate a 128-dimensional feature vector of the reference image.

The neural network processor 103 may further reduce the dimensions of the encoded feature vector, for optimizing the encoded feature vector. In an embodiment, the neural network processor 103 may perform dimensionality reduction using Principal Component Analysis (PCA). During the training phase, the neural network learns to generate a feature vector (including values) of fixed length (number of values in the feature vector is fixed). It is observed that some of the values in the feature vector are 0. During the inference stage (after the n-dimensional feature vector is generated), the neural network processor 103 may perform feature optimization of the encoded feature vector by eliminating the dimensions (values) of the encoded feature vector that are represented by the value of 0. In an example, a 128-dimensional feature vector may be optimized into a 70-dimensional feature vector.

The cluster generating engine 104 may create clusters including images that are similar to each other. The similarities between two images may be determined by measuring the cosine distance between the feature vectors of the two images. The size of a cluster and the number of images in the cluster may vary based on a degree of similarity between the feature vectors of the images in the cluster. The degree of similarity between images is inversely proportional to the cosine distance between the feature vectors of the images. In an embodiment, the cluster generating engine 104 may create clusters, wherein the degree of similarity between the feature vectors of the images in each of the clusters may fall in a particular category. In an embodiment, the categories are a duplicate category, a near-duplicate category, a similar category, and a near-similar category. It is noted that each succeeding category includes the former category.

The degree of similarity between the feature vectors of the images in each of the clusters may be classified into more than or less than the aforementioned four categories (duplicate, near-duplicate, similar, and near-similar).

The cluster generating engine 104 may correlate the cosine distance between the feature vectors of the images in a cluster with the category of degree of similarity between the feature vectors of the images in a cluster. In an embodiment, if the cosine distances between the feature vectors of the images in each of the created clusters are within a range [0-1], the degree of similarity between the images will be considered as duplicate. If the cosine distances between the feature vectors of the images in each of the created clusters are within a range [0-10], the degree of similarity between the images may be considered as near-duplicate. The images that are duplicates are included in the near-duplicate category. If the cosine distances between the feature vectors of the images in each of the created clusters are within a range [0-25], the degree of similarity between the images may be considered as similar. The images that are duplicates and near-duplicates are included in the similar category. If the cosine distances between the feature vectors of the images in each of the created clusters are within a range [0-30], the degree of similarity between the images will be considered as near-similar. The images that are duplicates, near-duplicates, and similar, are included in the near-similar category. For example, if the degree of similarity between the images in each of the clusters is categorized as near-duplicate, the cosine distance between the images in each of the clusters is greater than is equal to, or less than 10.

For a simpler representation of the cosine distances between the images in the clusters, the cosine distances have been multiplied by a factor of 1000 to arrive at the ranges. The actual values of the cosine distances are [0-0.001], [0-0.01], [0-0.025], and [0-0.03]. Hereon, the values of the cosine distances need to be interpreted as having being multiplied by a factor of 1000.

The cosine distances between all image-pairs fall within one of the well-defined ranges [0-0.001], [0-0.01], [0-0.025], and [0-0.03]. Based on the range in which the cosine distance between an image-pair falls, the embodiments classify the degree of similarity between the images of the image-pair into one of the categories, viz., duplicate, near-duplicate, similar, and near-similar. It is to be noted that the well-defined ranges have been determined based on experimental analysis by training the neural network processor 103 using a particular training dataset. The ranges may change, i.e., if an image-pair with a same cosine distance may be classified into a different category if the training dataset considered for training the neural network processor 103 is changed.

In an embodiment, the cluster generating engine 104 may set the ranges to be used for categorizing the degree of similarity, based on image datasets used for training the neural network mode. If the cosine distance between the feature vectors of two images is greater than 30, then the images may be considered to be dissimilar (or different). The value of 30 may be determined based on image datasets used for training the neural network mode.

The neural network processor 103 generates feature vectors of all images stored in the memory 105. Consider that the cluster generating engine 104 creates a cluster including the reference image and one or more images, wherein the cosine distances between the reference image (a queried image) and the one or more images is less than 1. In this scenario, the degree of similarity between the reference image and the one or more images will be categorized as duplicate, i.e., the reference image and the one or more images are duplicates of each other.

The cluster generating engine 104 allows a user of the device 100 to dynamically configure a threshold distance through the input interface 101. The user may set the threshold distance in the range 0-30. The cluster generating engine 104 may receive the user input (threshold distance) as an indication of the degree of similarity between the images with which the cluster is formed. The threshold distance indicates whether the user intends to create clusters including (only) duplicate images, near-duplicate images, similar images, and near-similar images. The clusters that include near-duplicate images also include duplicate images. The clusters that include similar images also include duplicate images and near-duplicate images. The clusters that include near-similar images also include duplicate images, near-duplicate images, and similar images. The cosine distances between each of the fetched images and the reference image is less than or equal to the threshold distance.

If a query image (reference image) is not provided, and if the user sets the threshold distance as 28 (for example), the cluster generating engine 104 may generate clusters including the one or more images, wherein the cosine distances between the images in each of the clusters is less than or equal to 28. The degree of similarity between the images in each of the clusters may be categorized as duplicate, near-duplicate, and/or similar. Thereafter, the cluster generating engine 104 may display the clusters of images on the display 106.

In an embodiment, the cluster generating engine 104 may create the clusters using a combination of linear scan and a tree clustering method. The linear scan involves categorizing, by the cluster generating engine 104, the images in the device 100, based on metadata pertaining to the images. In an example, the metadata may include temporal data and location specific data. The temporal data may refer to the timestamp that indicates the date and time when an image was captured. The location specific data may refer to the location at which an image was captured. Once the metadata is extracted, the cluster generating engine 104 selects images stored in the memory 105, which have been captured at the same time and/or images that have been captured at the same location.

The selected images may act as input data points of the tree clustering method. The tree clustering method may be either of KD-tree, PCA tree, ball tree, K-means, and VP-tree. The tree clustering method determines the cosine distances between the feature vectors of the selected images, and creates one or more clusters including the selected images, wherein the cosine distances between the feature vectors of the images in each of the created clusters can fall in either of the ranges [0-1], [0-10], [0-25], or [0-30]. Each of the clusters includes images, wherein the degree of similarity between the images in each of the clusters are categorized as duplicate, near-duplicate, similar, or near-similar.

It may be noted that all images stored in the memory 105 may not include the necessary metadata to perform linear scan. In that scenario, all images can be considered as input data points by the tree clustering method. The user can set the threshold distance in the range [0-30], which falls in one of the ranges [0-1], [0-10], [0-25], or [0-30]. Based on the threshold distance set by the user, the cluster generating engine 104 creates clusters, wherein the degree of similarity between images in each of the clusters are categorized as duplicate, near-duplicate, similar, or near-similar.

FIG. 1 shows exemplary units of the device 100, but it is to be understood that other embodiments are not limited thereon. In other embodiments, the device 100 may include less or more units. Further, the labels or names of the units of the device 100 are used only for illustrative purposes and do not limit the scope of the invention. One or more units can be combined together to perform the same or substantially the same function in the device 100.

Figure 2:
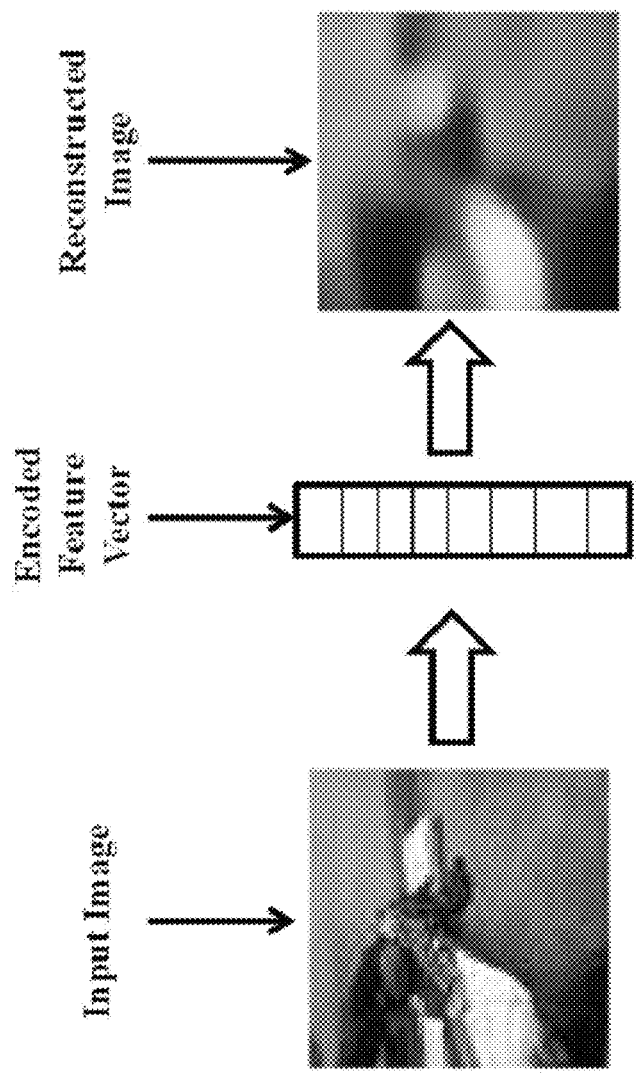
FIG. 2 is an example depiction of reconstruction of an encoded image, by the neural network model, during a training phase, according to embodiments of the disclosure.

FIG. 2 is an example depiction of reconstruction of an encoded image, by the neural network model, during the training phase, according to embodiments as disclosed herein. Consider that an input image is fed to the pre-processor 102. As depicted in FIG. 2, the input image can be resized and provided to the encoder stage of the neural network model (in the neural network processor 103). The encoder stage extracts the spatial features and the global features of the resized input image. The spatial features and the global features can be reduced, by the encoder stage, to generate a 128-length (dimension) feature vector of the input image. The encoder stage is trained to reduce the dimension of the input image to generate the feature vector, which represents the key features of the input image.

The feature vector is generated such that the input image may be reconstructed to an extent, wherein the distinguishing features of the input image may be retrieved using the 128 values of the feature vector. The retrieval of the distinguishing features allows comparing the reconstructed image with other images, to determine the degree of similarity between the reconstructed image and the other images. In an embodiment, the decoder stage may generate an image, which is the reconstructed input image, wherein the feature vector is fed as input to the decoder stage. The decoder stage may include a dense layer, and three CNNs, which may reconstruct the input image from the 128-valued feature vector.

Figure 3:
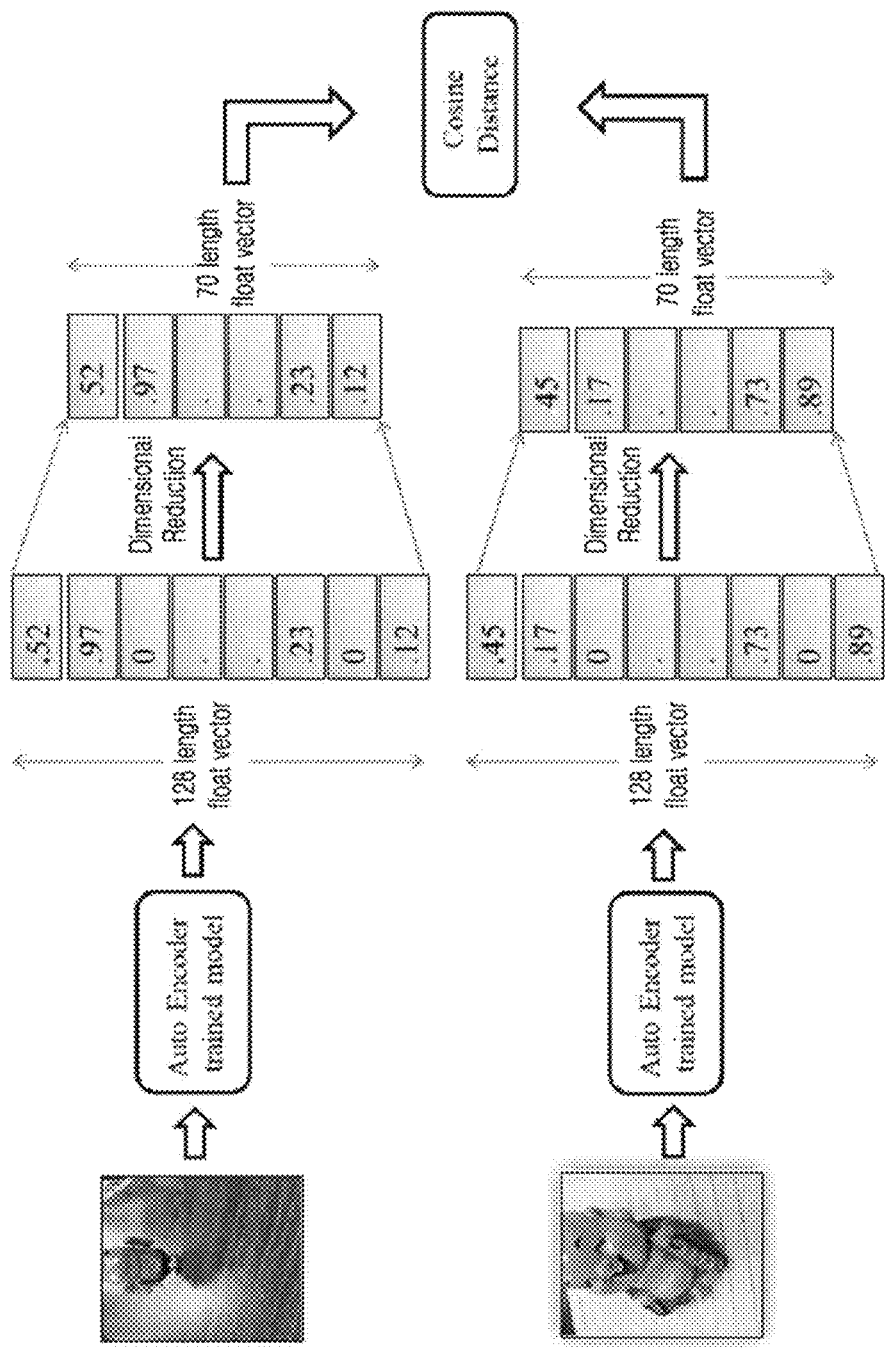
FIG. 3 is an example depiction of comparison between feature vectors of two images for determining the degree of similarity between the images, according to embodiments of the disclosure.

FIG. 3 is an example depiction of comparison between feature vectors of two images for determining the degree of similarity between the images, according to embodiments as disclosed herein. As depicted in FIG. 3, the images may be fed to the auto encoder trained model (neural network model used in the neural network processor 103). The auto encoder trained model may generate 128-valued feature vectors corresponding to the two images. The feature vectors may be further optimized through dimensionality reduction, wherein the feature indices including non-zero values may be retained. Once the feature vectors have been determined, the cosine distance between the feature vectors of the two images may be evaluated. Based on the value of the cosine distance, the degree of similarity may be determined as either duplicate, near-duplicate, similar, and near-similar. The entire range of cosine distance values may be categorized into different of degrees of similarity. It has been determined that if the cosine distance between the feature vectors of two images is greater than 30, the images are different (which may be perceived visually). The entire range of cosine distance values, which may be segmented in one of the categories of degrees of similarity, is 0-30.

Figure 4:
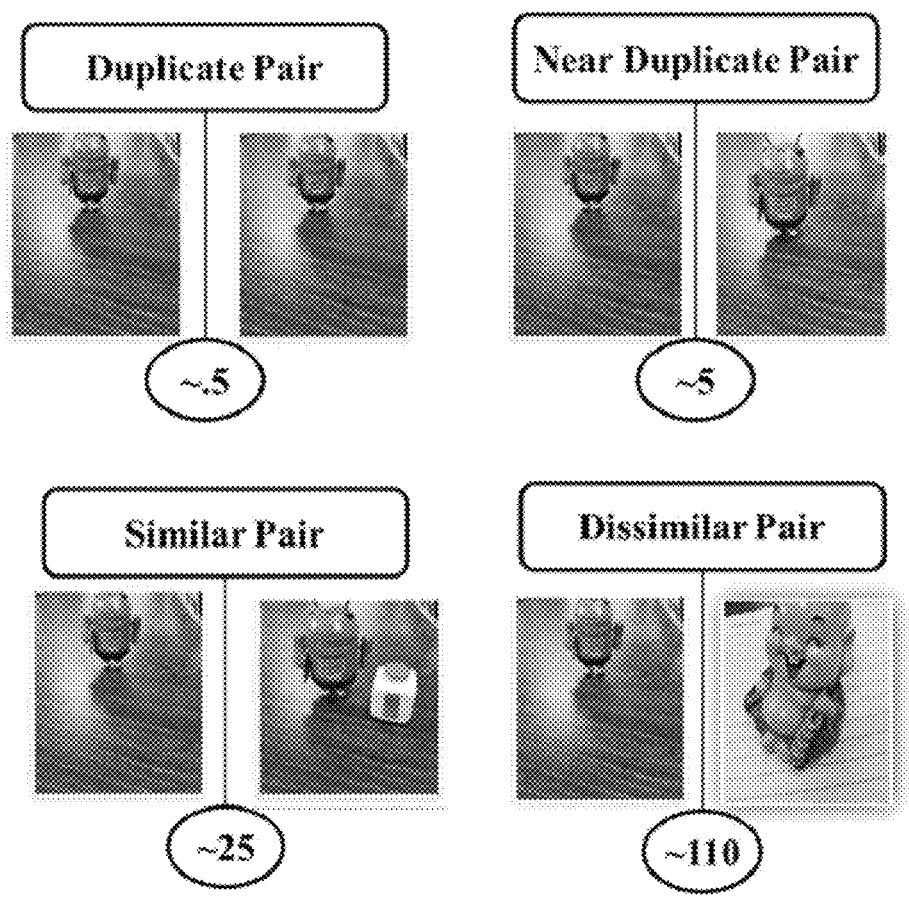
FIG. 4 depicts four example image pairs specifying the different degrees of similarity between the images in each of the image pairs, corresponding to different cosine distances, according to embodiments of the disclosure.

FIG. 4 depicts four example image pairs specifying the different degrees of similarity between the images in each of the image pairs, corresponding to different cosine distances, according to embodiments as disclosed herein. As depicted in FIG. 4, the degree of similarity between the images of the first image pair is categorized as duplicate. The cosine distance between the feature vectors of the images of the first image pair is approximately 0.5. The value of the cosine distance falls in the range that corresponds to the degree of similarity categorized as duplicate (0-1). The cosine distance between the feature vectors of the images of the second image pair is approximately 5. The value of the cosine distance falls in the range that corresponds to the degree of similarity categorized as near-duplicate (1-10).

The cosine distance between the feature vectors of the images of the third image pair is approximately 25. The value of the cosine distance falls in the range that corresponds to the degree of similarity categorized as similar (10-25). The cosine distance between the feature vectors of the images of the fourth image pair is approximately 110. The value of the cosine distance falls outside any of the ranges that correspond to any one of the degrees of similarity. Therefore, the images of the fourth image pair are considered as different (which may also be perceived visually).

Figure 5A:
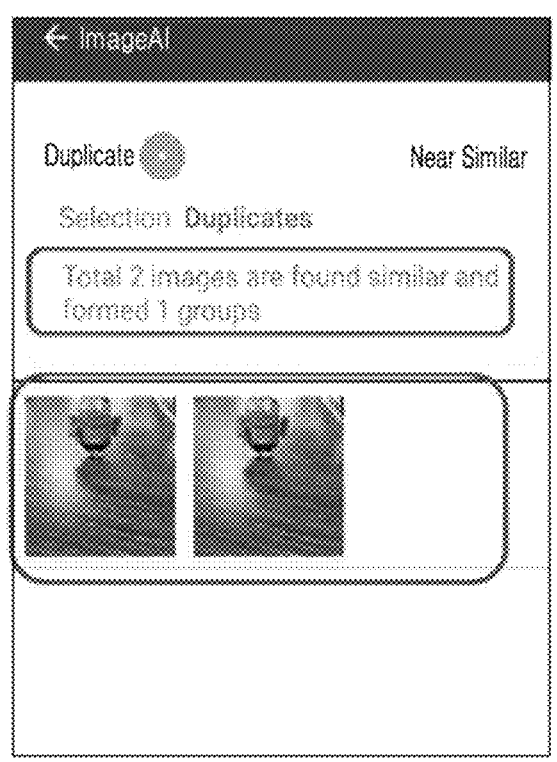
FIGS. 5A-5D depict an example user interface that allows users to configure a threshold distance for retrieving images, which are clustered together based on degree of similarity between them, according to embodiments of the disclosure.

FIGS. 5A- to 5D depict an example user interface that allows users to configure a threshold distance for retrieving images, which are clustered together based on degree of similarity between them, according to embodiments as herein. The user can vary the threshold distance using a slider. The variation of the threshold distance leads to formation of clusters of images, wherein the degree of similarity between the images in each of the clusters is categorized as either duplicate, near-duplicate, similar, or near-similar. When the user places the slider at the extreme left position, the cluster generating engine 104 may interpret that the threshold distance has been set to 1, and clusters need to be created, wherein the cosine distance between the images in each of the clusters must be in the range [0-1]. The degree of similarity between the images in each of the clusters is categorized as duplicate.

In an embodiment, as the position of the slider is progressively shifted towards the right direction, clusters are generated; wherein the degree of similarity between the images in each of the clusters progressively shifts from duplicate to near-duplicate (threshold distance is interpreted as been set to 10), near-duplicate to similar (threshold distance is interpreted as been set to 25), and similar to near-similar (threshold distance is interpreted as been set to 30). If the cosine distances between each of the image-pairs in the device 100 are more than 30, then clusters may not be formed. This is because the images are different from each other.

Figure 5B:
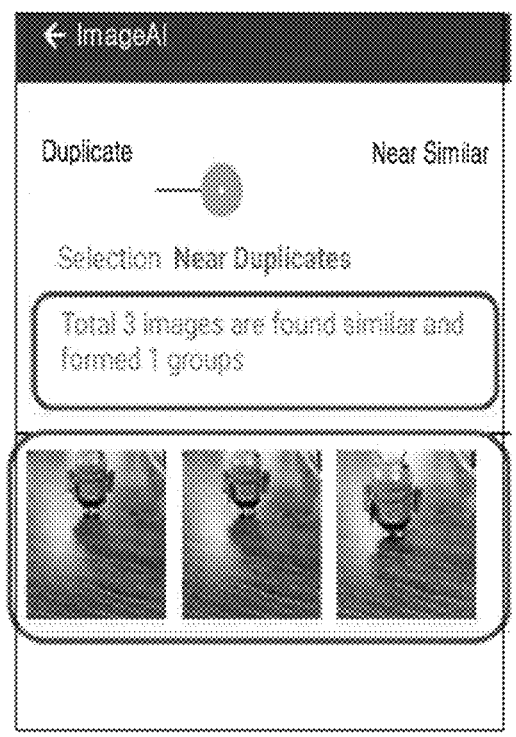

Consider that a single cluster is created, wherein the degree of similarity between the images in the cluster depends on the threshold distance set by the user. The user sets the threshold distance through the slider. As depicted in FIG. 5A, the user has placed the slider at the leftmost point. The embodiments include determining two images that are duplicates. The cosine distance between the two images is in the range [0-1]. As depicted in FIG. 5B, the user has changed the position of the slider to the right (relative to the previous position). The embodiments include determining three images, wherein two images are duplicate and the third image is near-duplicate with respect to the other two images. The cosine distance between the two images is in the range [0-10].

Figure 5C:
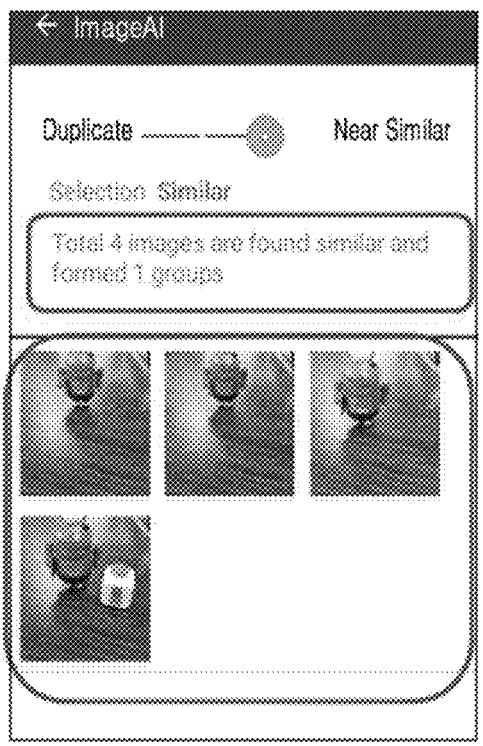
Figure 5D:
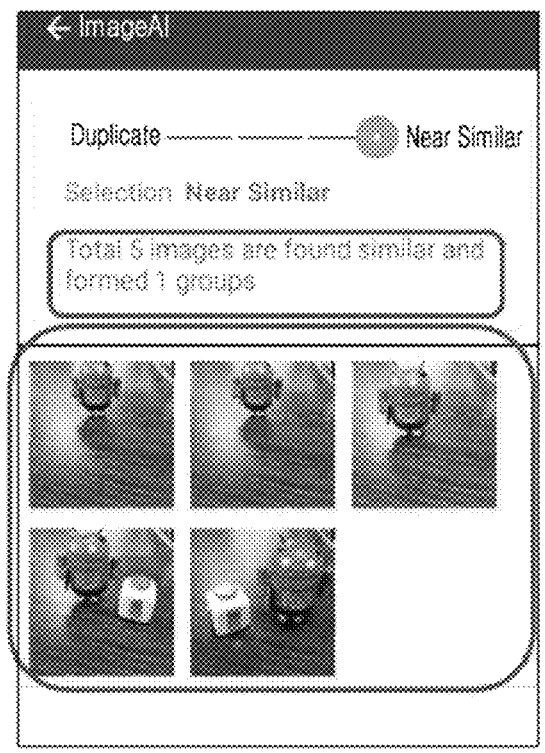

As depicted in FIG. 5C, the user has changed the position of the slider further to the right (relative to the previous position). The embodiments include determining four images, wherein the images in the cluster are duplicates, near-duplicates, and similar to each other. The cosine distance between the two images is in the range [0-25]. As depicted in FIG. 5D, the user has changed the position of the slider to the extreme right position. The embodiments include determining five images. The images in the cluster are duplicates, near-duplicates, similar, and near-similar to each other. The cosine distance between the two images is in the range [0-30].

FIGS. 6A to 6E are example user interfaces depicting the formation of clusters, wherein number of clusters and number of images in each of the clusters may change based on the configured threshold distance, according to embodiments as herein. The user can configure the threshold distance by varying the position of the slider. The position of the slider may be set at a particular level amongst six levels (L-1 (extreme left) to L-6 (extreme right)). The values of threshold distance corresponding to the six levels are 1 (L1), 5 (L2), 10 (L3), 20 (L4), 25 (L5), and 30 (L6). It is to be noted that the threshold distances representing the levels have been multiplied by 1000 (as mentioned in FIG. 1). The threshold distance is configured by the user such that degree of similarity between the images in each of the clusters may be varied across duplicate and near-similar categories by shifting the position of the slider from the extreme left position to the extreme right position.

Figure 6A:
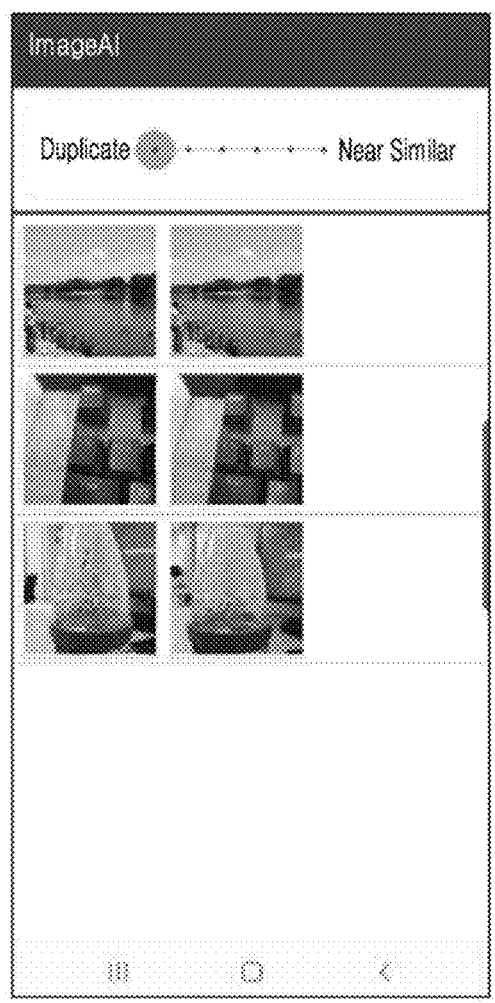
FIGS. 6A-6E are example user interfaces depicting the formation of clusters, wherein number of clusters and number of images in each of the clusters may change based on the configured threshold distance, according to embodiments of the disclosure.

As depicted in FIG. 6A, the position of the slider is at the extreme left position, i.e., L1. The threshold distance is configured to 1. The cluster generating engine 104 may create three clusters, wherein each cluster includes two images. The cosine distance between the images in each of the three clusters is in the range [0-1]. The degree of similarity between the two images in each of the three clusters is categorized as duplicate, i.e., the images in each of the three clusters are duplicates.

Figure 6B:
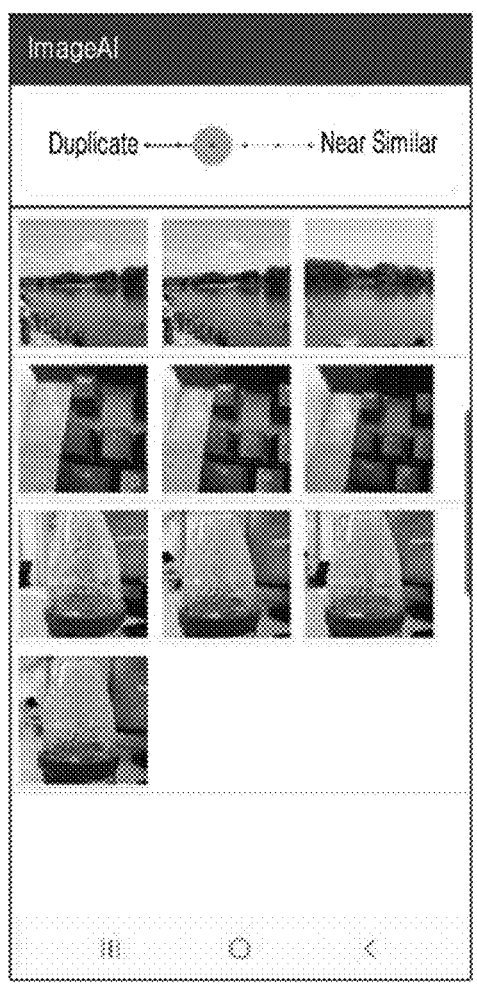

As depicted in FIG. 6B, the position of the slider is shifted to the right, i.e., L3. The threshold distance is configured to 5. The cluster generating engine 104 may create three clusters, wherein the first cluster and the second cluster include three images each. The third cluster includes four images. The cosine distance between the images in each of the three clusters is in the range [0-5]. The degrees of similarities between the images in each of the three clusters may be duplicates and near-duplicates.

Figure 6C:
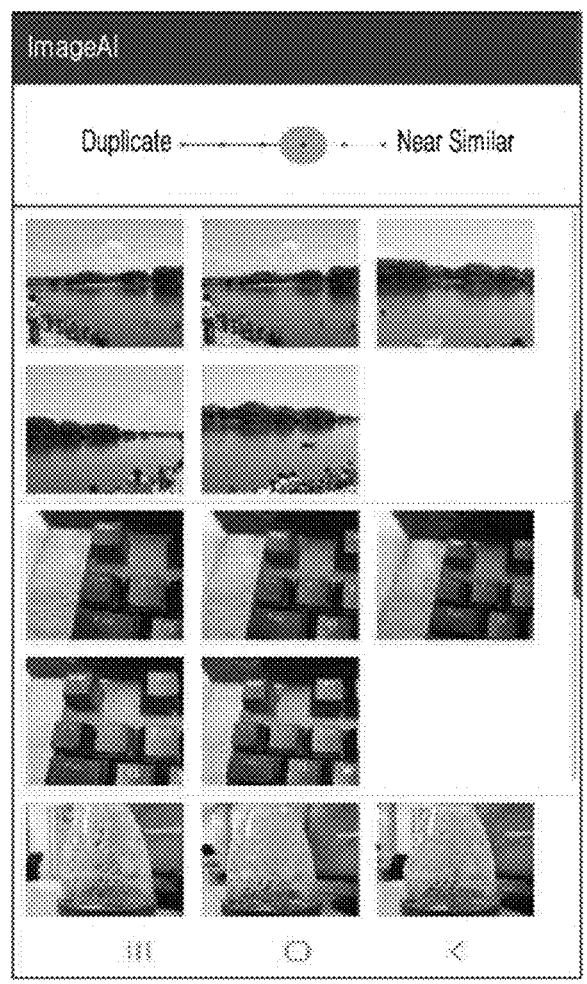

As depicted in FIG. 6C, the position of the slider is shifted further to the right, i.e., L4. The threshold distance has been configured to 20. The cluster generating engine 104 may create three clusters, wherein each of the first cluster and the second cluster includes five images. The third cluster includes at least four images (the fourth image or other image(s) in the third cluster are not shown). The cosine distance between the images in each of the three clusters is in the range [0-20]. The degrees of similarities between the images in each of the three clusters may be duplicates, near-duplicates, and similar.

Figure 6D:
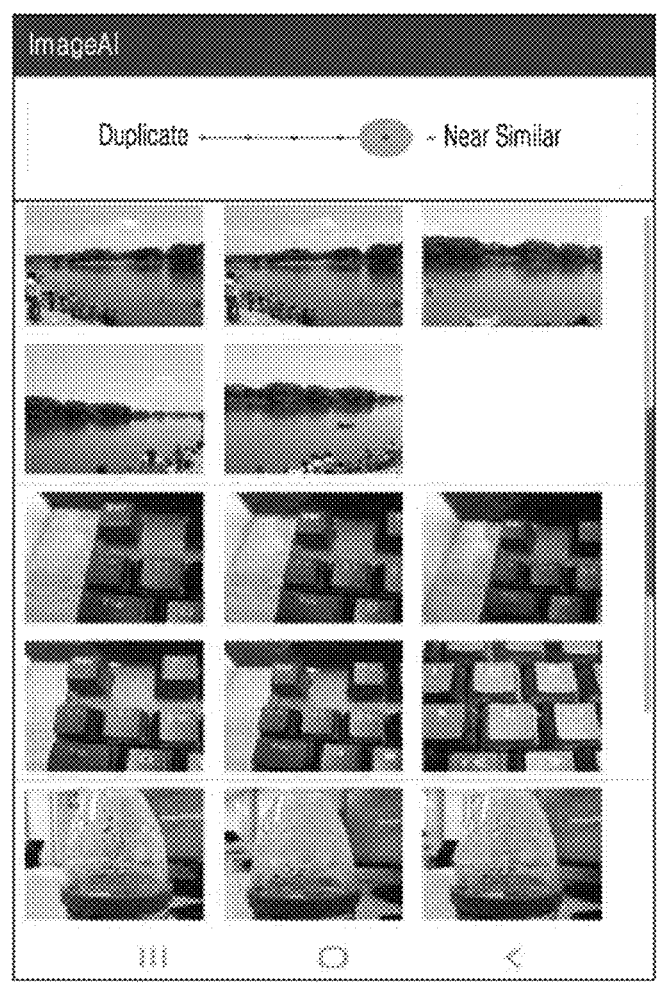

As depicted in FIG. 6D, the position of the slider is shifted further to the right, i.e., L5. The threshold distance has been configured to 25. The cluster generating engine 104 may create three clusters, wherein the first cluster includes five images, the second cluster includes six images, and the third cluster includes at least four images (fourth image or other image(s) in the third cluster are not shown). The cosine distance between the images in each of the three clusters is in the range [0-25]. The degrees of similarities between the images in each of the three clusters may be duplicates, near-duplicates, and similar.

Figure 6E:
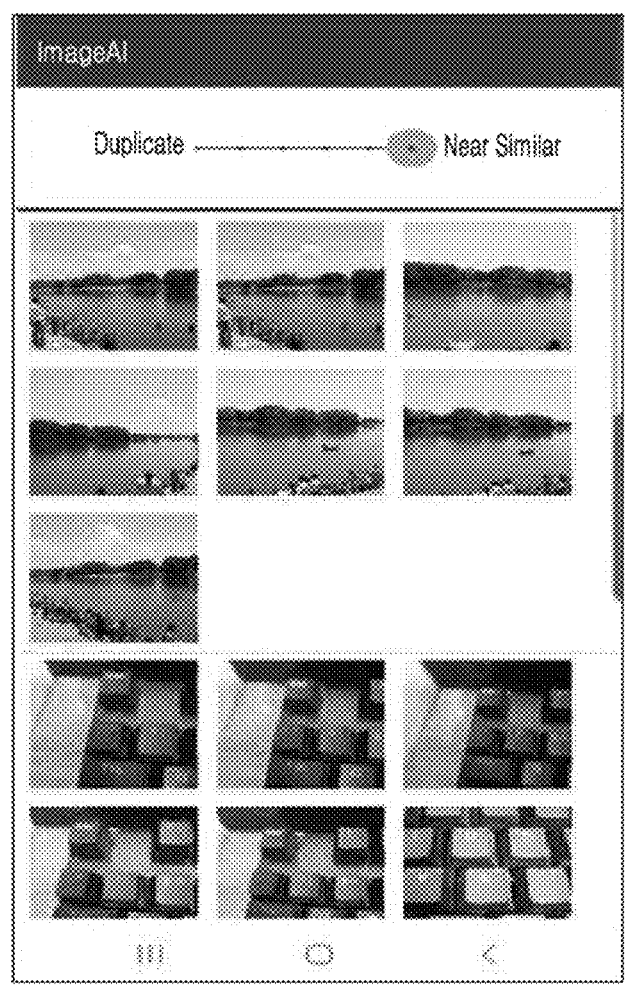

As depicted in FIG. 6E, the position of the slider is shifted to the extreme right position, i.e., L6. The threshold distance has been configured to 30. The cluster generating engine 104 may create at least three clusters (third cluster or other cluster(s) are not shown); wherein the first cluster includes seven images, and the second cluster includes at least six images (other image(s) in the second cluster are not shown). The image(s) in the third cluster are not shown. The cosine distance between the images in each of the three clusters is in the range [0-30]. The degrees of similarities between the images in each of the three clusters are duplicates, near-duplicates, similar, and near-similar.

Figure 7A:
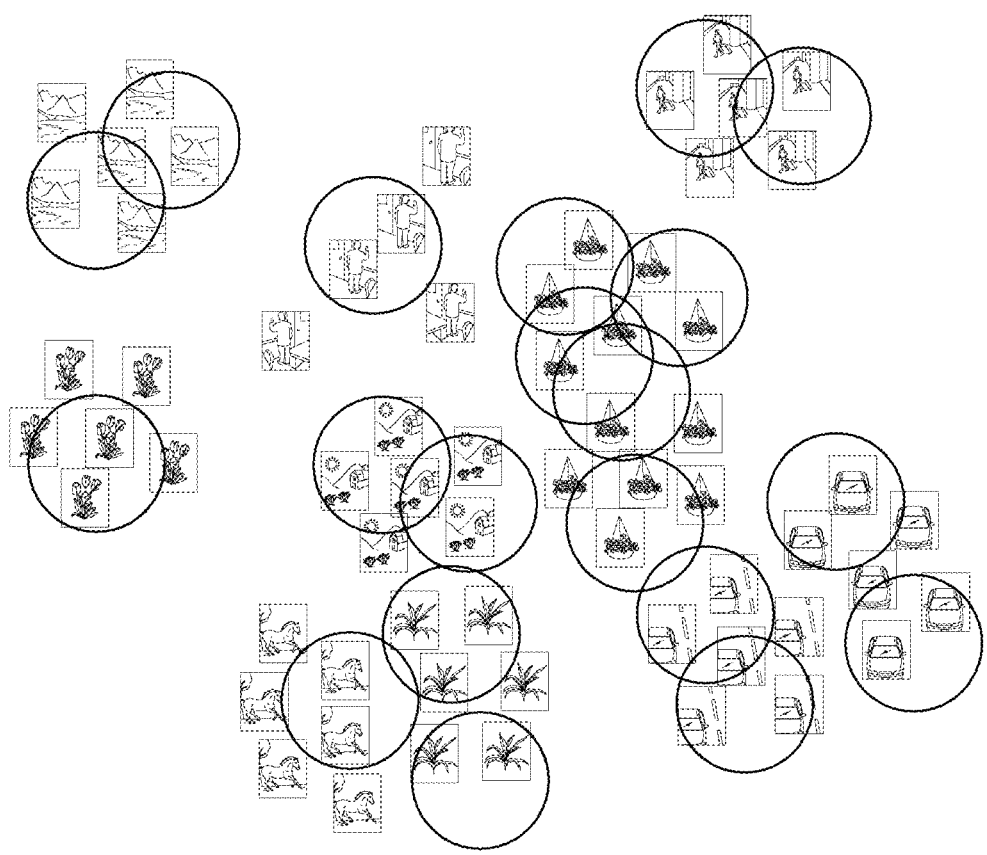
FIGS. 7A-7E depicts an example variation in number of clusters formed and variation in number of images in each cluster, with respect to the variation in the threshold distance configured by the users, according to the embodiments of the disclosure.

FIGS. 7A to 7E depicts an example variation in number of clusters formed and variation in number of images in each cluster, with respect to the variation in the threshold distance configured by the user, according to the embodiments as disclosed herein. The number of clusters increases with a decreasing threshold distance. Conversely, the number of clusters decreases with an increasing threshold distance. As depicted in FIG. 7A, when the threshold distance is configured to 0.5, about 20 clusters are created using the tree-clustering methods. The cosine distances between the images in each of the clusters are in the range [0-0.5]. The images in each of the clusters are duplicates or filtered versions of each other.

Figure 7B:
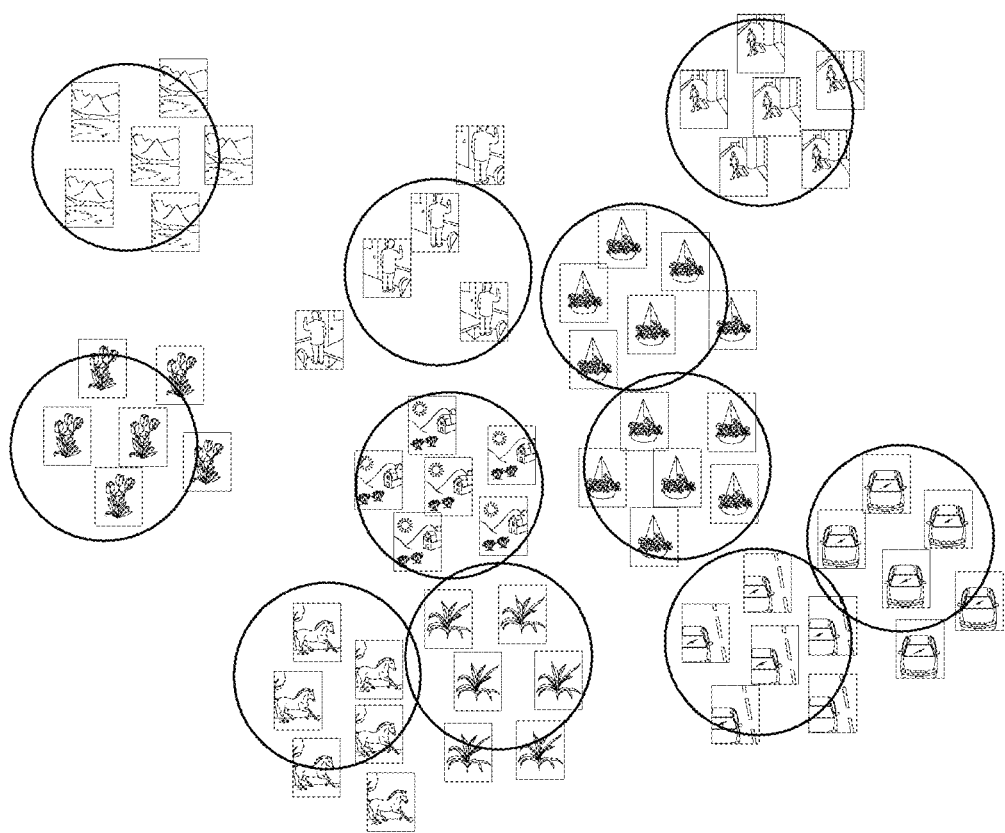

As depicted in FIG. 7B, an increase in the threshold distance to 10 (from 0.5), the number of clusters has reduced to 11 (from 20). The cosine distances between the images in each of the clusters are in the range [0-10]. The number of clusters reduces as the clusters may include duplicate and near-duplicate images. Thus, the number of images in each of the clusters increases.

Figure 7C:
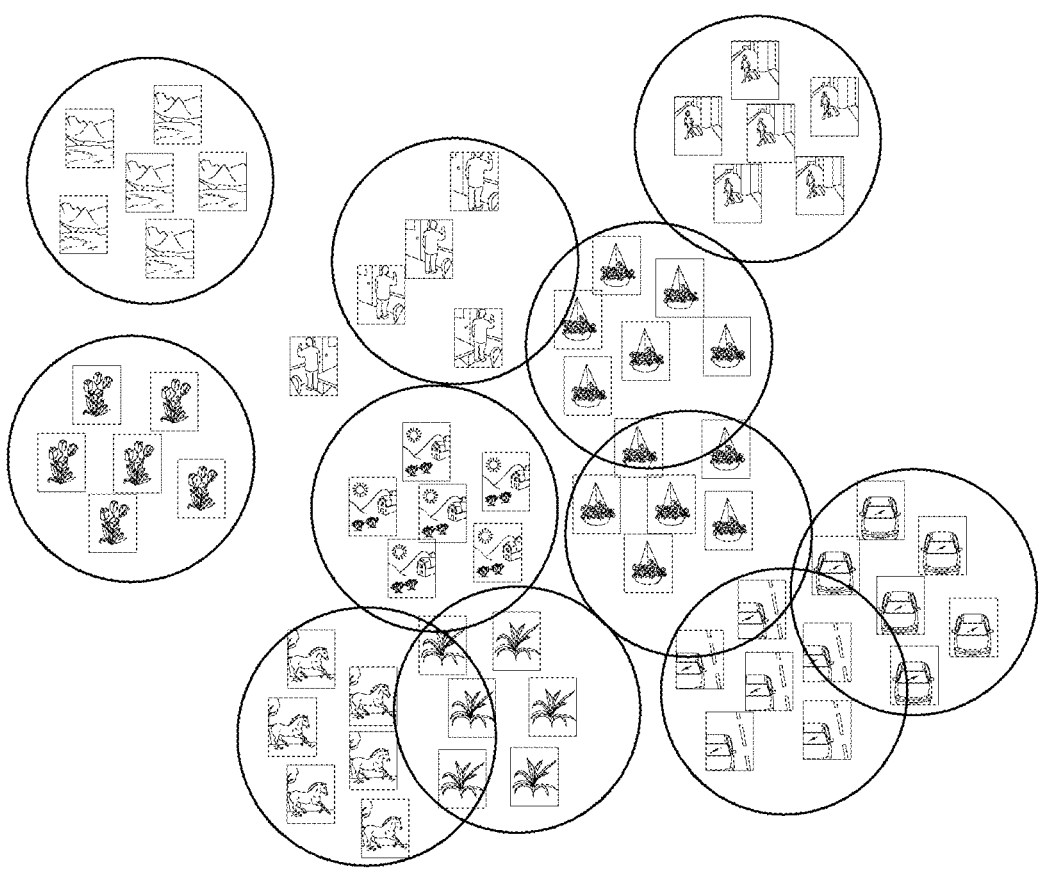

As depicted in FIG. 7C, when the threshold distance increases to 25, the number of clusters remain the same (11), compared to when the threshold distance was configured to 10. However, the sizes of the clusters have increased to accommodate more images. The clusters include duplicate images, near-duplicate images, and similar images. The cosine distances between the images in each of the clusters are in the range [0-25]. There are overlaps between clusters if the cosine distances between the images in the overlapping clusters are less than 25.

Figure 7D:
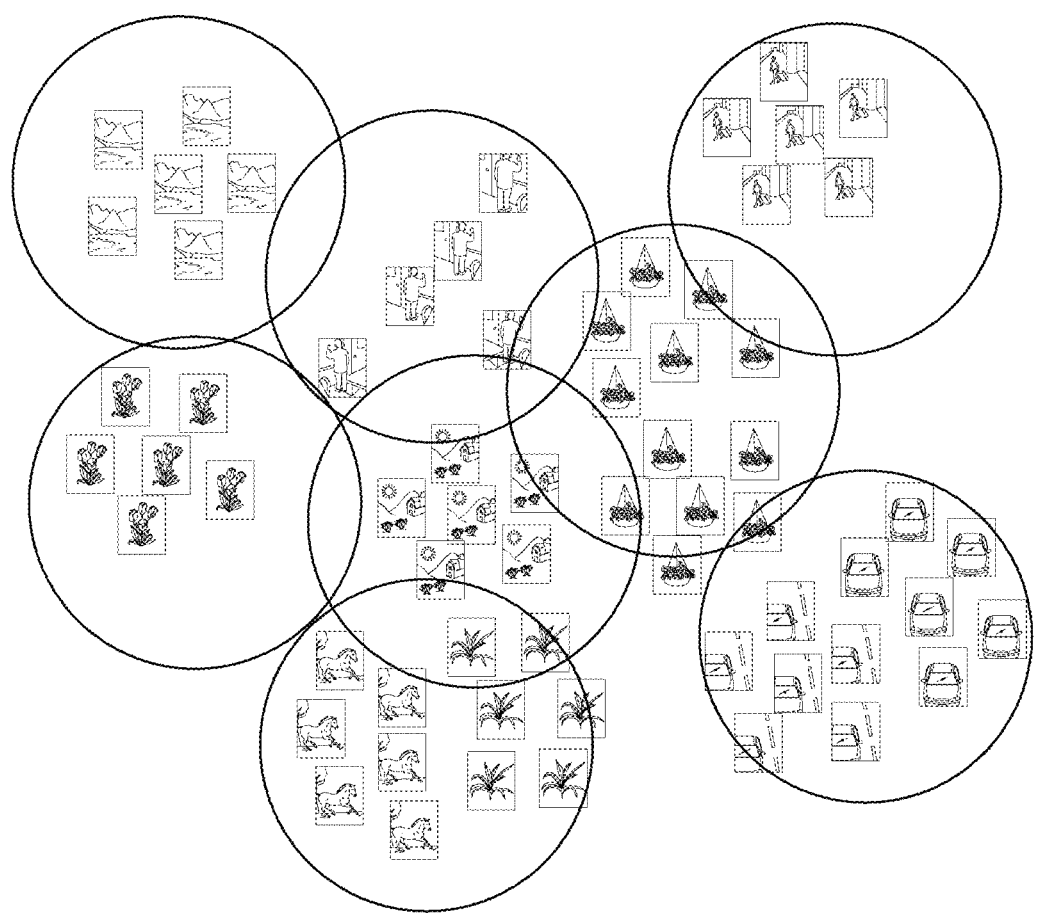
Figure 7E:
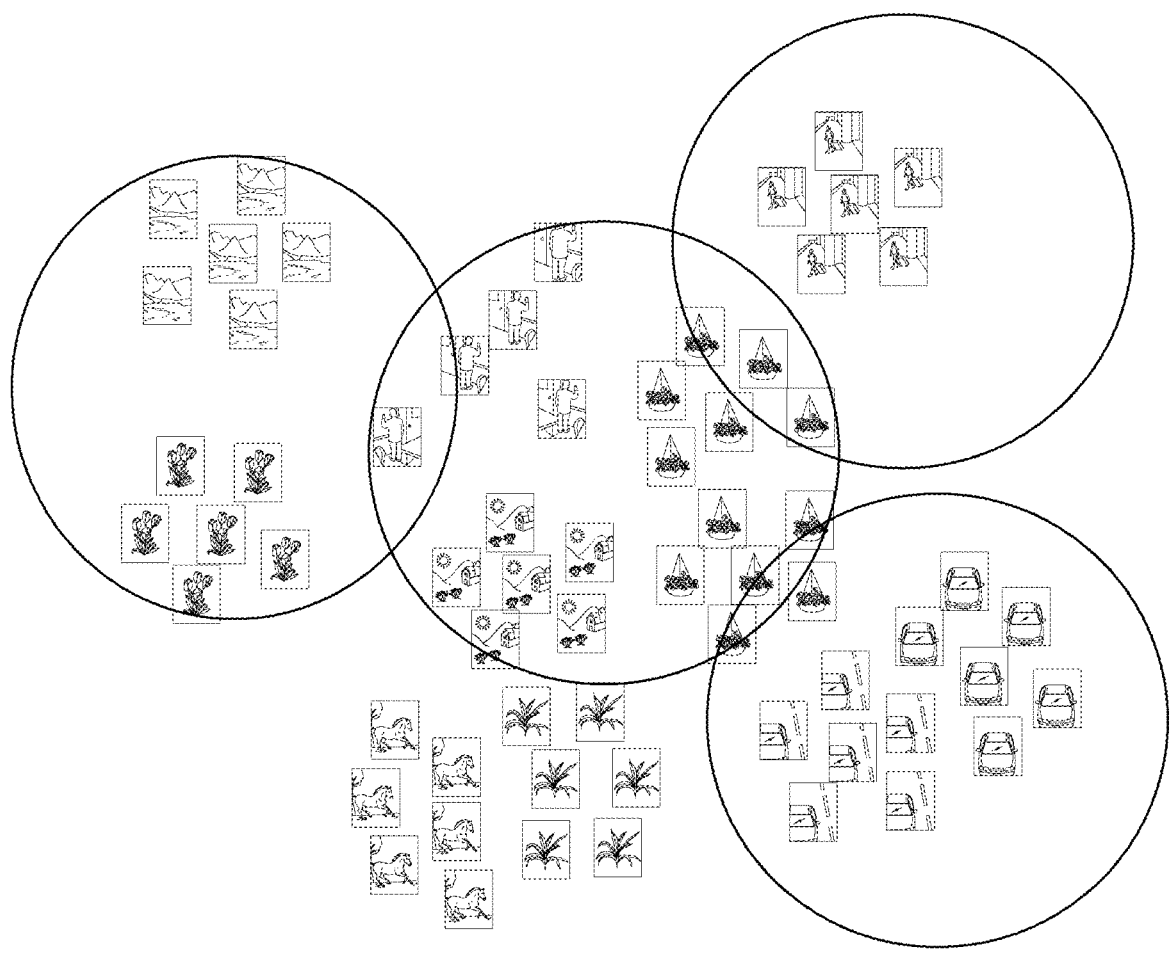

As depicted in FIG. 7D, when the threshold distance is configured to 40, the tree-clustering methods create 8 clusters. The cosine distances between the images in each of the clusters are in the range [0-40]. The number of clusters reduces and the number of images in each of the clusters increases. Each of the clusters may include duplicate images, near-duplicate images, similar, and near-similar images. There are also overlaps between clusters if the cosine distances between the images in overlapping clusters are less than 40. As depicted in FIG. 7E, when the threshold distance is configured to 70, the number of clusters reduces further (from 8 to 5). This is because the clusters have merged. The merging takes place because the clusters may accommodate images in the clusters wherein the cosine distances between the images in the clusters may be in the range [0-70]. Each of the clusters may include duplicate images, near-duplicate images, similar, and near-similar images.

Figure 8:
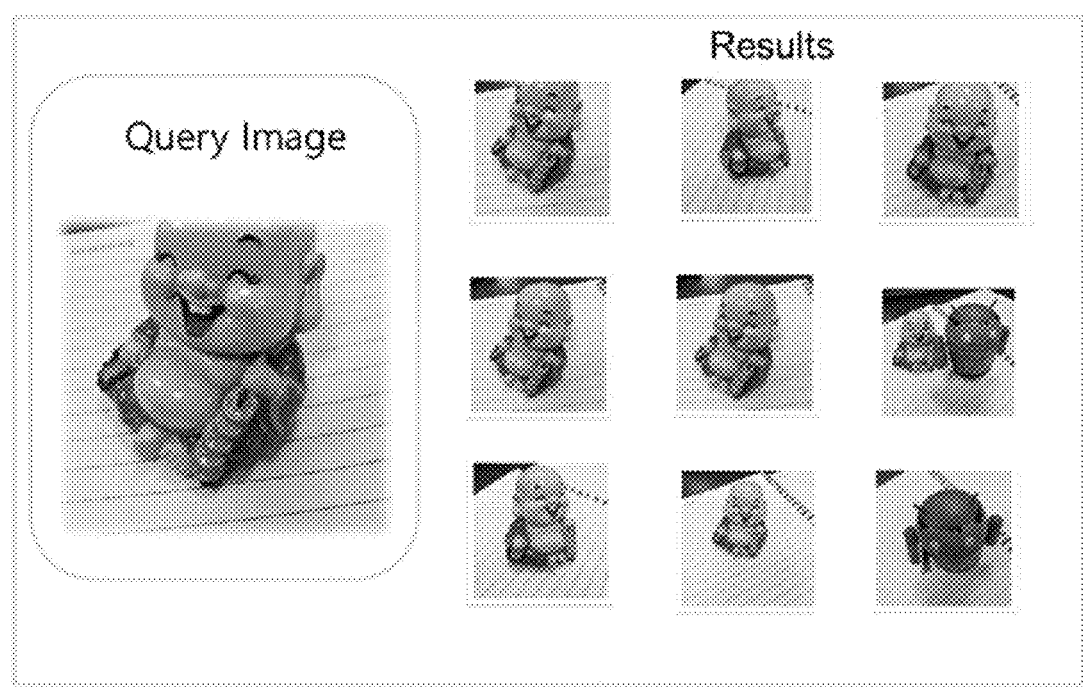
FIG. 8 depicts an example scenario, wherein images with different degrees of similarity with respect to a query image are fetched, according to embodiments of the disclosure.

FIG. 8 depicts an example scenario, wherein images with different degrees of similarity with respect to a query image are fetched, according to embodiments as disclosed herein. As depicted in FIG. 8, the user can select a reference image and query the image for retrieving images, from the memory 105, which are similar to the reference image in different degrees. The user can configure the threshold distance to indicate the degree of similarity of the images, which needs to be fetched, with respect to the reference image (query image). The embodiments include detecting 9 images, wherein the degree of similarity between the reference image and each of the fetched images are duplicate, near-duplicate, similar, and near-similar. This can indicate that the threshold distance has been set to a value that is less than 30.

Figure 9A:
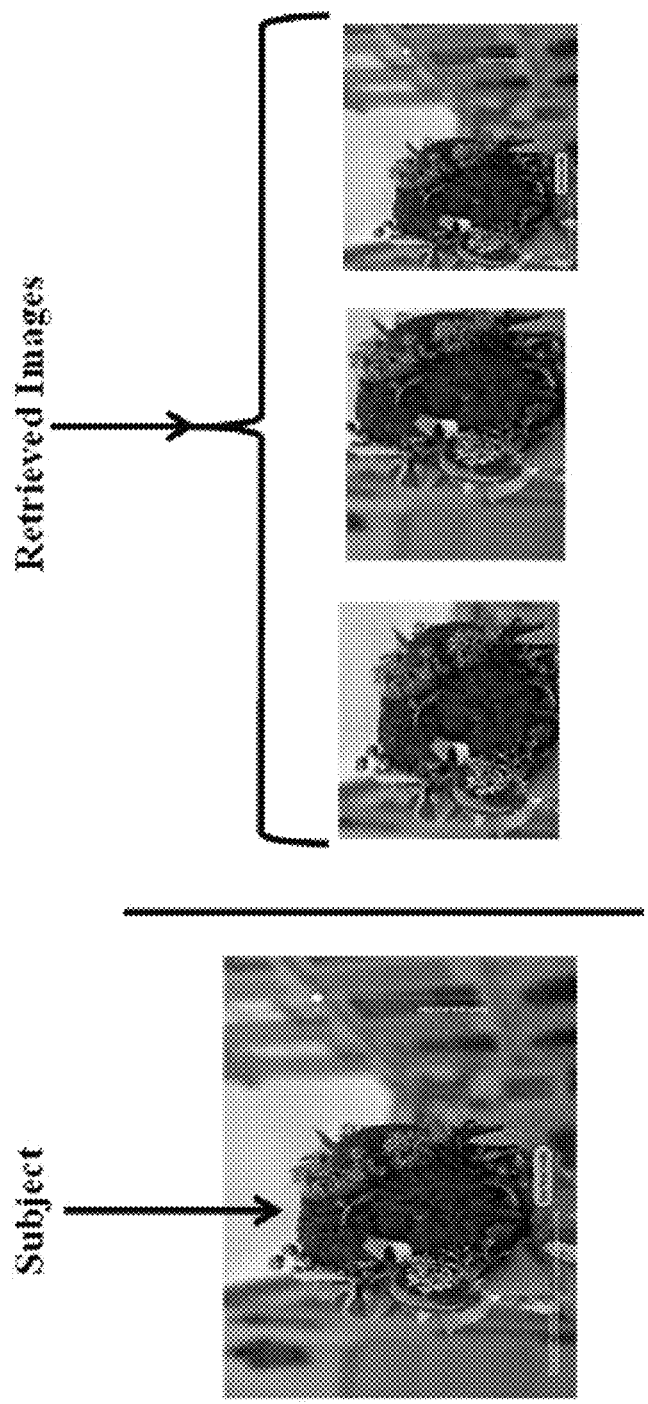
FIGS. 9A and 9B depict an example scenario, wherein query images include a focused object, and the focused object in the query images become subjects of query for retrieving images that include the subjects, according to embodiments of the disclosure.
Figure 9B:
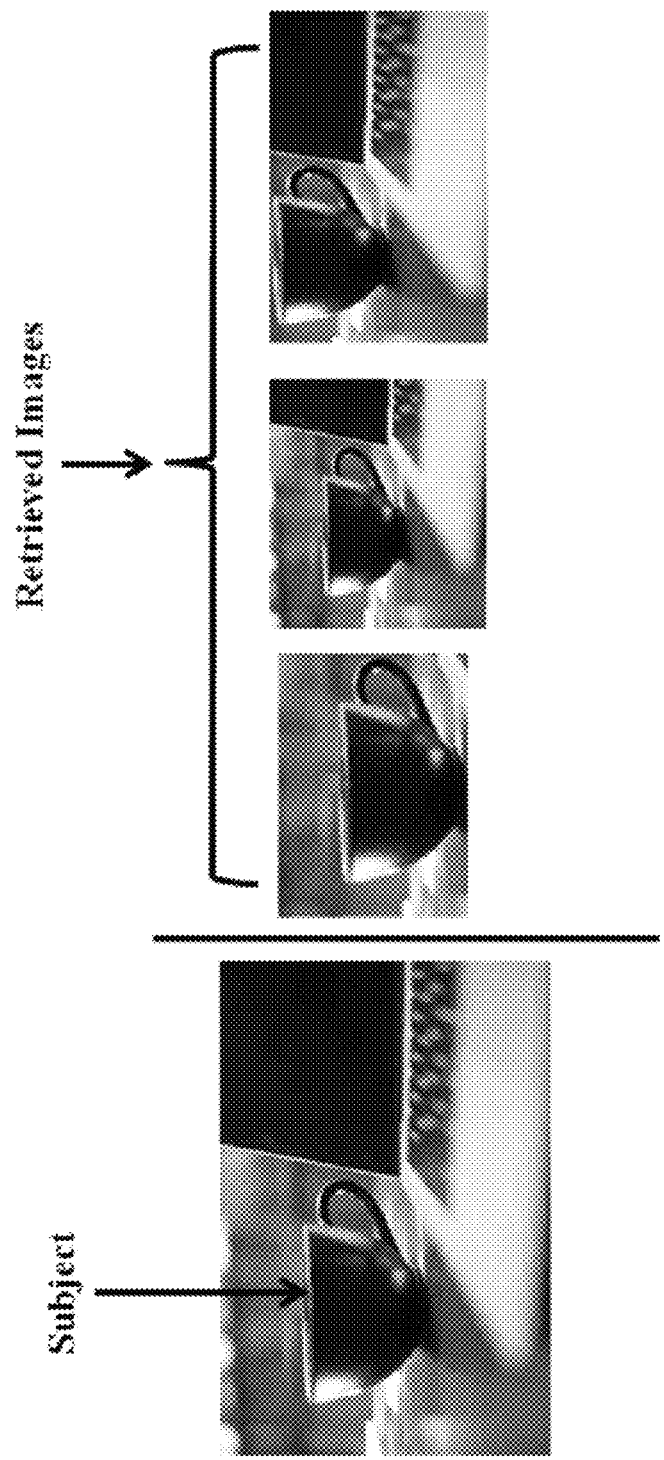

FIGS. 9A and 9B depict an example scenario, wherein query images include a focused object, and the focused object in the query images become subjects of query for retrieving images that include the subjects, according to embodiments as disclosed herein. As depicted in FIG. 9A, consider that the focused object in the query image is a flower vase. The flower vase will be the subject of query. The embodiments include retrieving three images, which include the flower vase. The cosine distance between the subject in the query image and the three retrieved images is such that the degree of similarity between the subject and the three retrieved images may be duplicate, near-duplicate, similar, or near-similar. As depicted in FIG. 9B, consider that the focused object in the query image is a cup. The cup becomes the subject of the query. The embodiments include retrieving three images, in which the cup is present.

Figure 10A:
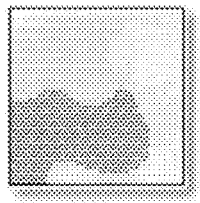
FIGS. 10A-10C depict examples of generation of theme packs based on a currently used theme, wherein the images in the theme packs are detected to be similar with respect to the currently used theme, according to embodiments of the disclosure.
Figure 10A:
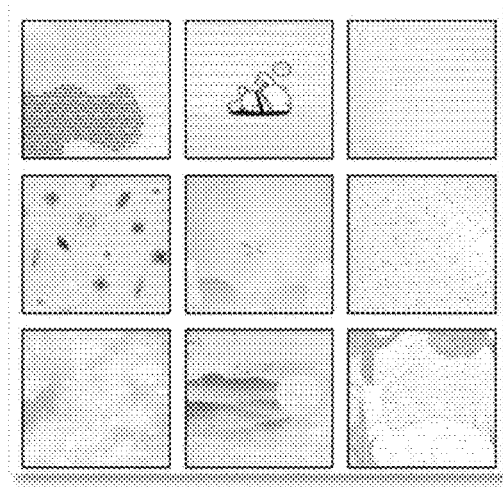
Figure 10B:
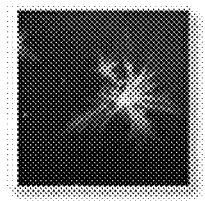
Figure 10B:
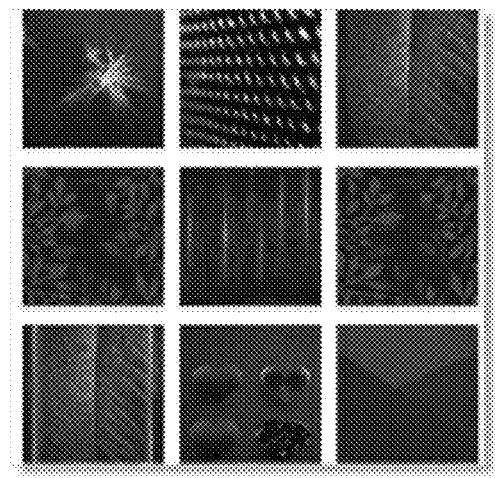
Figure 10C:
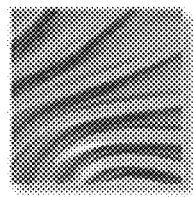
Figure 10C:
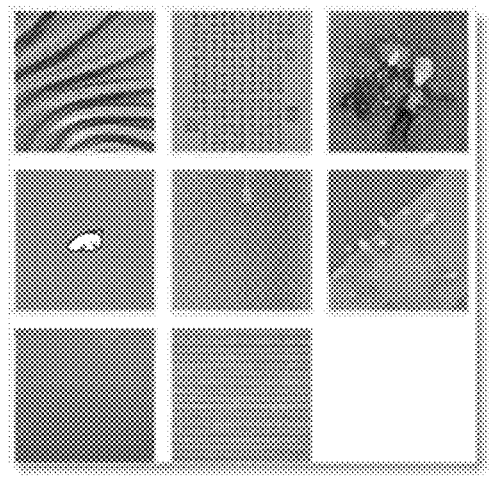

FIGS. 10A, 10B, and 10C depict examples of generation of theme packs based on a currently used theme, wherein the images in the theme packs are detected to be similar with respect to the currently used theme, according to embodiments as disclosed herein. The currently used theme is an image, which can be considered as a reference image. The embodiments include generating a feature vector of the reference image (currently used theme). The embodiments include retrieving images from the device or from the Internet, wherein the degree of similarity between the reference image and the retrieved images are near-duplicate and/or similar. The embodiments include generating a theme pack, which includes the retrieved images. The theme pack is suggested to the user for theme selection.

The embodiments include optimizing the creation of Graphics Interchange Format (GIF). In a GIF, a plurality of images may be concatenated temporally. Consider that a GIF includes 20 images. Each image may be displayed for 100 milliseconds. The images may be considered as frames. The size of the GIF depends on the size of the images. The duration of the GIF is 2 seconds. The embodiments include optimizing the GIF by reducing the size and the duration of the GIF. The embodiments include determining the feature vectors of all images in the GIF. The embodiments include creating clusters of images, wherein cosine distance between the images in each of the clusters indicates the degree of similarity. The embodiments include determining the duplicate/non-duplicate/similar images in the GIF, based on cosine distances between the images in the GIF. The embodiments include providing options for choosing to eliminate the duplicate copies (if any), the near-duplicate copies (if any), or the similar copies (if any), of the images, for reducing the number of images in the GIF, and thereby reduce the size and the duration of the GIF.

Figure 11:
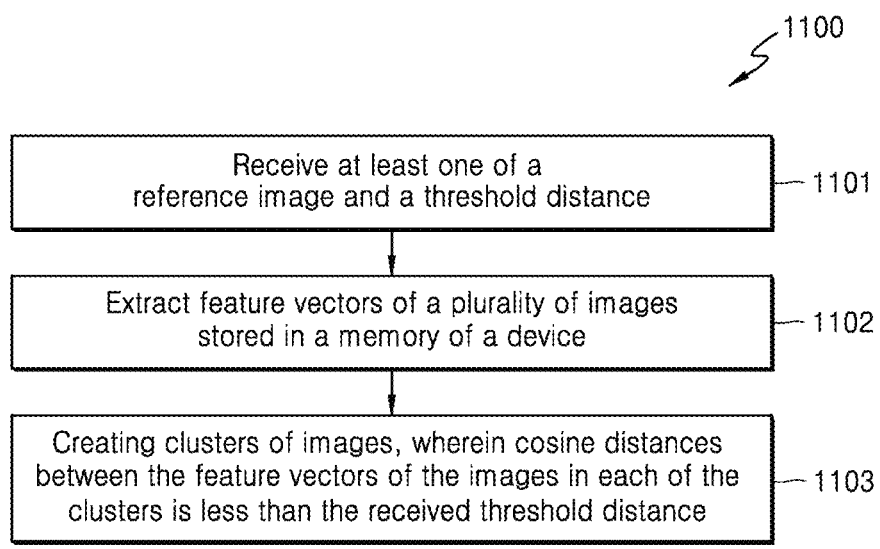
FIG. 11 is a flowchart depicting a method for creating clusters of images based on different degrees of similarities between the images in each of the clusters, according to embodiments of the disclosure.

FIG. 11 is a flowchart 1100 depicting a method for creating clusters of images based on different degrees of similarities between the images in each of the clusters, according to embodiments as disclosed herein. In operation 1101, at least one of a reference image and a threshold distance is received. In an embodiment, the user may query an image. The image queried by the user may be considered as the reference image. The embodiments include retrieving images that are similar to the reference image. The embodiments include receiving a threshold distance, which indicates that the difference between the features of the reference image and the retrieved image(s) must be less than the threshold distance.

In an embodiment, if the reference image is not provided by the user and if only the threshold distance is provided, the embodiments include creating clusters including images, wherein the differences between the features of the images in each of the clusters is less than the threshold distance.

In operation 1102, feature vectors of a plurality of images are extracted. The plurality of images includes the reference image. In an embodiment, the plurality of images may be stored in the memory 105 of the device 100. The embodiments include preprocessing each of the plurality of images, wherein the plurality of images may be resized to a preconfigured size. The images which are in gray scale may be converted to RGB format. The pixel values of each of the plurality of images may be normalized such that the pixel values fall in the range 0-1. Each of the plurality of images may be represented as a 1-D array of pixel values.

The 1-D arrays may be provided to the input layer of the neural network model. The neural network model is configured to generate feature vectors of each of the plurality of images. For each image, the neural network model may extract spatial features and global features. The spatial features include shape and contour of one or more objects in the image, the positions of the one or more objects, positions of the one or more objects relative to each other, and so on. The global features include pixel density, density of color, color distribution of the image, and so on. The neural network model is configured to summarize the extracted spatial and global features of the image to generate the feature vector of the image.

In operation 1103, clusters of images are created, wherein the cosine distances between the feature vectors of the images in each of the clusters is less than the received threshold distance. The embodiments include creating the clusters using a linear scan and a tree clustering method. The linear scan involves categorizing the plurality of images based on metadata pertaining to the images, such as temporal data and location specific data. The temporal data refers to the timestamp that indicates the date and time when an image was captured. The location specific data may refer to the location at which an image was captured.

The embodiments include selecting images, amongst the plurality of images, which have been captured at the same time and/or images that have been captured at the same location. The selected images are data points that are provided as input to the tree clustering method. The tree clustering method determines the cosine distances between the feature vectors of the selected images, and creates one or more clusters including the selected images, wherein the cosine distances between the feature vectors of the images in each of the created clusters may fall in the range [0-1], [0-10], [0-25], or [0-30].

If the relevant metadata pertaining to the plurality of images is not available, each of the plurality of images may be considered as input data points by the tree clustering method. The user can set the threshold distance in the range [0-30]. Based on the threshold distance set by the user, the embodiments include creating the clusters, wherein cosine distances between the feature vectors of the images in each of the created clusters may fall in the range [0-1], [0-10], [0-25], or [0-30].

The user can configure the threshold distance. The threshold distance defines the boundary of the degree of similarity between the feature vectors of the images that will be grouped together in the clusters. The threshold distance is a value of cosine distance, wherein the cosine distance between the feature vectors of the images in each of the clusters is less than the threshold distance. The threshold distance is inversely proportional to the degree of similarity between the images. If the threshold distance is high, the degree of similarity between the images in the clusters will vary from high to low; as the clusters may include images, wherein the cosine distances between the feature vectors of the images in the clusters may vary within the threshold distance. Conversely, if the threshold distance is low, the degree of similarity between the images in the clusters will be high; as the clusters will include those images which are having a high degree of similarity between them.

The degrees of similarity are duplicate, near-duplicate, similar, and near-similar. The degree of similarity between images decreases from duplicate to near-similar, wherein images having the highest similarity are duplicate and images with least similarity are near-similar. In the embodiments, the cosine distance between the feature vectors of the images in the clusters may be correlated with the degree of similarity between the feature vectors of the images in the clusters. If the cosine distances between the feature vectors of the images in each of the clusters are within a range [0-1], the degree of similarity between the images is considered as duplicate. If the cosine distances between the feature vectors of the images in each of the clusters are within a range [0-10], the degree of similarity between the images is near-duplicate. If the cosine distances between the feature vectors of the images in each of the clusters are within a range [0-25], the degree of similarity between the images is similar. If the cosine distances between the feature vectors of the images in each of the created clusters are within a range [0-30], the degree of similarity between the images is near-similar.

If the threshold distance is set such that the degree of similarity is near-similar, then clusters will be created, wherein the degree of similarity between the images in the clusters may be near-similar (cosine distances between the feature vectors of the images in the clusters is in the range [25-30]), similar (cosine distances between the feature vectors of the images in the clusters is [10-25]), near-duplicate (cosine distances between the feature vectors of the images in the clusters is [1-10]), and duplicate (cosine distances between the feature vectors of the images in the clusters is [0-1]).

Similarly, if the threshold distance is set such that the degree of similarity is similar, then clusters will be created, wherein the degree of similarity between the images in the clusters may be similar, near-duplicate and duplicate. If the threshold distance is set such that the degree of similarity is near-duplicate, then clusters will be created, wherein the degree of similarity between the images in the clusters may be near-duplicate and duplicate. If the threshold distance is set such that the degree of similarity is duplicate, then clusters will be created, wherein the images in the clusters will be duplicates of each other.

With an increase in the value of threshold distance the clusters merge and the number of created clusters decreases, as the number of images in each cluster increases.

The various actions in the flowchart 1100 may be performed in the order presented, in a different order, or simultaneously. Further, in some embodiments, some actions listed in FIG. 11 may be omitted.

Figure 12:
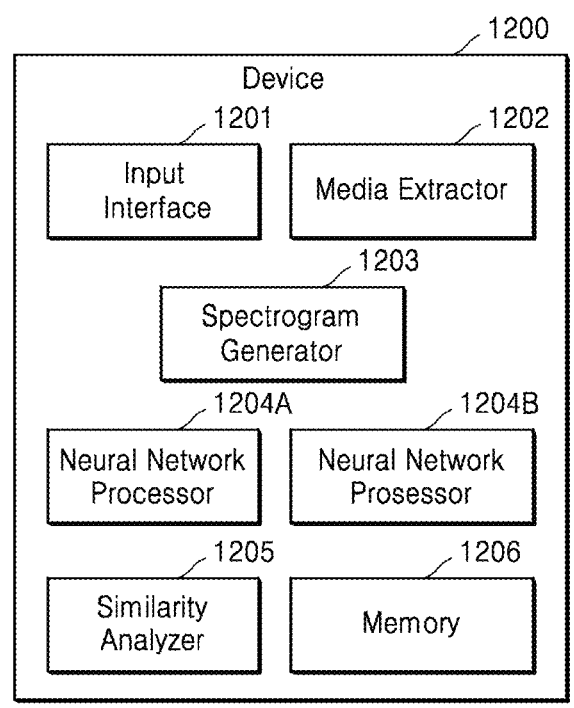
FIG. 12 depicts a device that is configured to detect duplicate audio files and duplicate video files in the device, according to embodiments of the disclosure.

FIG. 12 depicts a device 1200 that is configured to detect duplicate audio files and duplicate video files in the device 1200, according to embodiments as disclosed herein. As depicted in FIG. 12, the device 1200 includes an input interface 1201, a media extractor 1202, a spectrogram generator 1203, neural network processor 1204A a neural network processor 1204B, a similarity analyzer 1205, and a memory 1206. Examples of the device 1200 are, but not limited to, a smart phone, a tablet, a laptop, a computing device, a personal computer, an IoT device, a wearable device, a virtual reality device, and so on.

In order to detect duplicate audio/video files, it is necessary that the files are of same time duration in terms of number of seconds. The embodiments include forming clusters of audio/video files, wherein the duration of the audio/video files are similar based on time duration in terms of number of seconds or minutes. Consider that two audio files of 180 seconds and 190 seconds have been clustered together. In this scenario, the second audio file will be curtailed to 180 seconds. This will ensure that the audio files are of same length and are eligible for comparison.

When the user intends to detect audio files that are duplicates of a reference audio file, the user can query an audio file to indicate that the user intends to retrieve audio files that are duplicate with respect to the reference audio file. The user may query the reference audio file through the input interface 1201. The user may also indicate, through the input interface 1201, whether the user wants to retrieve duplicate audio files. In both scenarios, the media extractor 1202 may extract a predefined number of audio samples from the audio files in the memory 1206. In an embodiment, the number of samples to be extracted from the audio files is a square root of the durations of audio files in terms of number of seconds. For example, if the audio file is of 200 second duration, approximately, 15 audio samples may be extracted from the audio file. Each of the audio samples, extracted from the audio file, is of predefined time duration. In an embodiment, the duration of each audio sample is of one second duration.

In an embodiment, the spectrogram generator 1203 may generate spectrogram images corresponding to each of the audio samples of an audio file. In an example, the size of each of the spectrogram images is 100×64. The neural network processor 1204A is configured to extract features from each of the spectrogram images to generate n-dimensional feature vectors of each of the spectrogram images corresponding to each of the audio samples. In an example, the neural network processor 1204A may generate feature vectors of 1280 dimensions. Consider that 15 spectrogram images are generated from 15 audio samples extracted from the audio file. Therefore, the neural network processor 1204A generates 15 feature vectors. In an embodiment, the neural network processor 1204A may generate an audio feature vector of the audio file by concatenating the 15 feature vectors. Similarly, the neural network processor 1204A may generate audio feature vectors of all audio files in the memory 1206.

In an embodiment, a similarity analyzer 1205 may compare the audio feature vectors of different audio files. In an embodiment, the similarity analyzer 1205 employs a tree clustering method (such as VP tree) for measuring the cosine distances between the audio feature vectors of the audio files. The similarity analyzer 1205 is configured to detect that at least two audio files are duplicates if the audio feature vectors of the at least two audio files are less than a predefined threshold cosine distance. In an embodiment, the threshold cosine distance is 1.

When the user intends to detect video files that are duplicates of a reference video file, the user can query a video file to indicate that the user intends to retrieve video files that are duplicate with respect to the reference video file. The user may query the reference video file through the input interface 1201. The user may also indicate, through the input interface 1201, whether the user wants to retrieve duplicate video files. The media extractor 1202 may extract a predefined number of frame-sets from the video files. In an embodiment, the number of frame-sets to be extracted from the video files is a square root of the durations of video files in terms of number of seconds. For example, if a video file is of 100 second duration, approximately, 10 frame-sets are extracted from the video file. Each of the frame-sets, extracted from the video files, is of predefined time duration. In an embodiment, the duration of each frame-set is one second.

The media extractor 1202 may extract the audio portions and the visual portions of each of the frame-sets, extracted from a video file. The spectrogram generator 1203 may generate spectrogram images corresponding to the audio portions of each of the frame-sets of the video file. The neural network processor 1204A may generate feature vectors that correspond to the spectrogram images. The neural network processor 1204A may concatenate the feature vectors of the spectrogram images of the audio portions of the frame-sets of the video file to generate the audio feature vector. Similarly, audio feature vectors of other video files can be generated.

The similarity analyzer 1205 may detect whether the audio portions of the video files are duplicates based on the cosine distances between the audio feature vectors of the video files. In an embodiment, a tree-clustering method may be used for measuring the cosine distances between the audio feature vectors of the video files. If the cosine distances between the audio feature vectors of the video files are less than a predefined threshold cosine distance, the similarity analyzer 1205 may detect that the audio portions of the frame-sets of the video files are duplicates. In an embodiment, the threshold cosine distance is configured as 1.

The visual portions of each frame-set of a video file may include a predefined number of frames based on the type of video-encoding used. The neural network processor 1204B may extract feature vectors of each frame in each of the frame-sets in the video file. The functionality of the neural network processor 1204B is similar to that of the neural network processor 103. The neural network processor 1204B generates an n-dimensional feature vector for each frame in each of the frame-sets in the video file. The neural network processor 1204B may concatenate the n-dimensional feature vectors of each frame in each of the frame-sets to generate a visual feature vector of the video file. Similarly, the neural network processor 1204B may generate visual feature vectors of all video files that are stored in the memory 1206.

The similarity analyzer 1205 may detect whether the visual portions of the frame-sets of the video files are duplicates, based on the cosine distances between the visual feature vectors of the video files. In an embodiment, a tree-clustering method can be used for measuring the cosine distances between the visual feature vectors of the video files. The similarity analyzer 1205 may detect that the visual portions of the frame-sets of the video files are duplicate if the cosine distances between the visual feature vectors of the video files are less than a predefined threshold cosine distance. In an embodiment, the threshold cosine distance is 1.

The similarity analyzer 1205 may detect that at least two video files are duplicates if the audio portions of the frame-sets of the at least two video files are duplicates, and visual portions of the frame-sets of the at least two video files are duplicates.

FIG. 12 shows exemplary units of the device 1200, but it is to be understood that other embodiments are not limited thereon. In other embodiments, the device 1200 may include less or more number of units. Further, the labels or names of the units of the device 1200 are used only for illustrative purpose and does not limit the scope of the invention. One or more units can be combined together to perform same or substantially similar function in the device 1200.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein describe methods and systems for extracting features of a media (image/audio/video), identifying similarities between the features of the media, and dynamically clustering the media into groups based on the identified similarities between the features of the media. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the embodiments may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of pembodiments, those skilled in the art will recognize that the embodiments herein can be practiced with modification within the scope of the embodiments as described herein.

The invention claimed is:

1. A method of managing a plurality of images, the method comprising:

providing a graphical user interface (GUI) that presents a plurality of similarity levels and allows a user to select one of the plurality of similarity levels, wherein the plurality of similarity levels correspond to a plurality of threshold distances, respectively;

identifying one of the plurality of threshold distances for clustering the plurality of images based on a degree of similarity between the plurality of images;

extracting a plurality of feature vectors corresponding to the plurality of images by identifying spatial features and global features of each of the plurality of images; and generating a plurality of clusters each of which comprises at least two images among the plurality of images that are stored in at least one device, based on cosine distances between feature vectors corresponding to the at least two images in each of the plurality of clusters being less than the identified threshold distance.

2. The method of claim 1, wherein the extracting of the plurality of feature vectors corresponding to the plurality of images comprises:

generating each of the plurality of feature vectors corresponding to each of the plurality of images by summarizing the spatial features and the global features of each of the plurality of images.

3. The method of claim 1, wherein the spatial features comprise at least one of a shape and a contour of at least one object superimposed on a background of each of the plurality of images, a position of the at least one object, and a relative position of the at least one object with respect to at least one other object in each of the plurality of images.

4. The method of claim 1, wherein the global features comprise at least one of pixel density, texture, density of color, and color distribution across each of the plurality of images.

5. The method of claim 1, wherein the plurality of similarity levels presented in the GUI are categorized into a duplicate category, a near-duplicate category, a similar category, a near-similar category, and a dissimilar category, wherein the plurality of threshold distances correspond to the duplicate category, the near-duplicate category, the similar category, and the near-similar category, respectively.

6. The method of claim 5, wherein, when the identified threshold distance corresponds to the duplicate category, the at least two images in each of the plurality of clusters are determined to be duplicates;
when the identified threshold distance corresponds to the near-duplicate category, the at least two images in each of the plurality of clusters are determined to be duplicates or near-duplicates;
when the identified threshold distance corresponds to the similar category, the at least two images in each of the plurality of clusters are determined to be duplicates, near-duplicates, or similar; and
when the identified threshold distance corresponds to the near-similar category, the at least two images in each of the plurality of clusters are determined to be duplicates, near-duplicates, similar, or near-similar.

7. The method of claim 1, further comprising identifying a reference image among the plurality of images,
wherein the generating of the plurality of clusters comprises generating a first cluster comprising the reference image and at least one image of the plurality of images, and
wherein a cosine distance between one of the feature vectors that corresponds to the reference image and at least one feature vector corresponding to the at least one image in the first cluster is less than the identified threshold distance.

8. The method of claim 1, further comprising:
identifying metadata pertaining to each of the plurality of images; and
grouping the plurality of images based on the metadata.

9. The method of claim 8, wherein the metadata comprises at least one of a timestamp indicating a date and a time when each of the plurality of images was captured and a location where each of the plurality of images was captured.

10. An electronic device for managing a plurality of images, the electronic device comprising:
a display;
a memory storing at least one instruction; and
at least one processor configured to execute the at least one instruction to:
controlling the display to provide a graphical user interface (GUI) that presents a plurality of similarity levels and allows a user to select one of the plurality of similarity levels, wherein the plurality of similarity levels correspond to a plurality of threshold distances, respectively;
identify one of the plurality of threshold distances for clustering the plurality of images based on a degree of similarity between the plurality of images;
extract a plurality of feature vectors corresponding to the plurality of images by identifying spatial features and global features of each of the plurality of images; and
generate a plurality of clusters each of which comprises at least two images among the plurality of images that are stored in at least one device, based on cosine distances between feature vectors corresponding to the at least two images in each of the plurality of clusters being less than the identified threshold distance.

11. The electronic device of claim 10, wherein the at least one processor is further configured to execute the at least one instruction to:
generate each of the plurality of feature vectors corresponding to each of the plurality of images by summarizing the spatial features and the global features of each of the plurality of images.

12. The electronic device of claim 10, wherein the spatial features comprises at least one of a shape and a contour of at least one object superimposed on a background of each of the plurality of images, a position of the at least one object, and a relative position of the at least one object with respect to at least one other object in each of the plurality of images.

13. The electronic device of claim 10, wherein the global features comprise at least one of pixel density, texture, density of color, and color distribution across each of the plurality of images.

14. The electronic device of claim 10, wherein the plurality of similarity levels presented in the GUI are categorized into a duplicate category, a near-duplicate category, a similar category, a near-similar category, and a dissimilar category, wherein the plurality of threshold distances correspond to the duplicate category, the near-duplicate category, the similar category, and the near-similar category, respectively.

15. The electronic device of claim 14, wherein when the identified threshold distance corresponds to the duplicate category, the at least two images in each of the plurality of clusters are determined to be duplicates;
when the identified threshold distance corresponds to the near-duplicate category, the at least two images in each of the plurality of clusters are determined to be duplicates or near-duplicates;
when the identified threshold distance corresponds to the similar category, the at least two images in each of the plurality of clusters are determined to be duplicates, near-duplicates, or similar; and
when the identified threshold distance corresponds to the near-similar category, the at least two images in each of the plurality of clusters are determined to be duplicates, near-duplicates, similar, or near-similar.

16. The electronic device of claim 10, wherein the at least one processor is further configured to execute the at least one instruction to identify a reference image among the plurality of images, and generate a first cluster comprising the reference image and at least one image of the plurality of images, and
wherein a cosine distance between one of the feature vectors that corresponds to the reference image and at least one feature vector corresponding to the at least one image in the first cluster is less than the identified threshold distance.

17. The electronic device of claim 10, wherein the at least one processor is further configured to execute the at least one instruction to:
identify metadata pertaining to each image of the plurality of images; and
group the plurality of images based on the metadata.

18. The electronic device of claim 17, wherein the metadata comprises at least one of a timestamp indicating a date and a time when each of the plurality of images was captured and a location where each of the plurality of images was captured.

19. A non-transitory computer-readable storage medium storing instructions that are executable by at least one processor to perform a method of managing a plurality of images, the method comprising:
- providing a graphical user interface (GUI) that presents a plurality of similarity levels and allows a user to select one of the plurality of similarity levels, wherein the plurality of similarity levels correspond to a plurality of threshold distances, respectively;
- identifying one of the plurality of threshold distances for clustering the plurality of images based on a degree of similarity between the plurality of images;
- extracting a plurality of feature vectors corresponding to the plurality of images by identifying the plurality of feature vectors based on spatial features and global features of each of the plurality of image; and
- generating a plurality of clusters each of which comprises at least one cluster comprising at least two images among the plurality of images that are stored in at least one device, based on cosine distances between feature vectors corresponding to the at least two images in each of the plurality of clusters being less than the identified threshold distance.

* * * * *